United States Patent [19]
Collins

[11] Patent Number: 4,465,155
[45] Date of Patent: Aug. 14, 1984

[54] AUTOMATED OPERATORLESS VEHICLES
[76] Inventor: Marshall S. Collins, 316 Jasper Dr., Beckley, W. Va. 25801
[21] Appl. No.: 274,658
[22] Filed: Jun. 17, 1981
[51] Int. Cl.³ ............................................. B62D 1/00
[52] U.S. Cl. .................................. 180/169; 180/131; 299/1; 318/587; 340/686; 340/990; 343/7 VM; 364/424
[58] Field of Search ............ 180/169, 167, 131, 168; 318/587; 340/686, 23, 24, 33; 364/443–444, 448–450, 424, 436; 343/7 VM; 299/1

[56] References Cited

U.S. PATENT DOCUMENTS

| 2,674,332 | 4/1954 | Ovshinsky | 180/79.1 |
| 3,493,920 | 2/1970 | MacMunn | 343/7 VM |
| 3,612,206 | 10/1971 | Ohntrup | 180/98 |
| 3,669,206 | 6/1972 | Tax | 180/98 |
| 3,715,572 | 2/1973 | Bennett | 180/169 |
| 3,744,586 | 7/1973 | Leinaver | 180/79.1 |
| 3,845,289 | 7/1974 | French | 235/151.2 |
| 3,933,099 | 1/1976 | Reinhard | 180/98 |
| 3,961,166 | 6/1976 | Stobart | 340/24 |
| 4,026,654 | 5/1977 | Beaurain | 180/169 |
| 4,069,888 | 1/1978 | Wolters et al. | 180/169 |
| 4,072,945 | 6/1978 | Katsumata | 343/7 VM |
| 4,119,900 | 3/1979 | Kremnitz | 318/587 |
| 4,219,092 | 6/1981 | Richter | 180/169 |

FOREIGN PATENT DOCUMENTS

| 2518120 | 11/1976 | Fed. Rep. of Germany . |
| 2621939 | 11/1977 | Fed. Rep. of Germany . |
| 2814398 | 10/1979 | Fed. Rep. of Germany . |
| 3121684 | 12/1982 | Fed. Rep. of Germany . |
| 1550633 | 12/1968 | France . |
| 57-155610 | 9/1982 | Japan . |
| 57-155611 | 9/1982 | Japan . |
| 57-155612 | 9/1982 | Japan . |
| 57-155613 | 9/1982 | Japan . |
| 1403860 | 8/1973 | United Kingdom . |
| 274658 | 1/1977 | U.S.S.R. . |
| 637825 | 12/1978 | U.S.S.R. . |

Primary Examiner—David M. Mitchell
Assistant Examiner—Joseph G. McCarthy
Attorney, Agent, or Firm—Mason, Fenwick & Lawrence

[57] ABSTRACT

A vehicle guidance control system is described for an operatorless vehicle comprising a sensor for determining the presence of defined points along a selected path that the vehicle is to travel, a memory having a plurality of locations, each location for receiving one of a set of commands whereby the vehicle may be commanded to turn, pause, or to continue its movement. An address circuit is responsive to the detection of a point for addressing the corresponding location within the memory means, whereby command stored therein is executed to effect vehicle control. The vehicle guidance control system is adapted to guide the vehicle along a selected path within a set of corridors as would be found in a mine, wherein the corridors are disposed respectively along X and Y directions to form thereby a series of intersection points. The sensor means is disposed upon at least one side of the vehicle to sense the presence of an intersecting corridor, the address circuit accesses the location of the memory circuit corresponding to the detected point of intersection of the mine corridors to access the vehicle command stored at that location. The control guidance system includes a second location within the memory circuit for retaining the location of the vehicle in terms of its X,Y coordinate position within the grid of corridors, the output of the sensor serving to update the stored current vehicle position. Upon reaching an intersection of corridors, the second memory location is also updated as to the current location of the vehicle.

55 Claims, 23 Drawing Figures

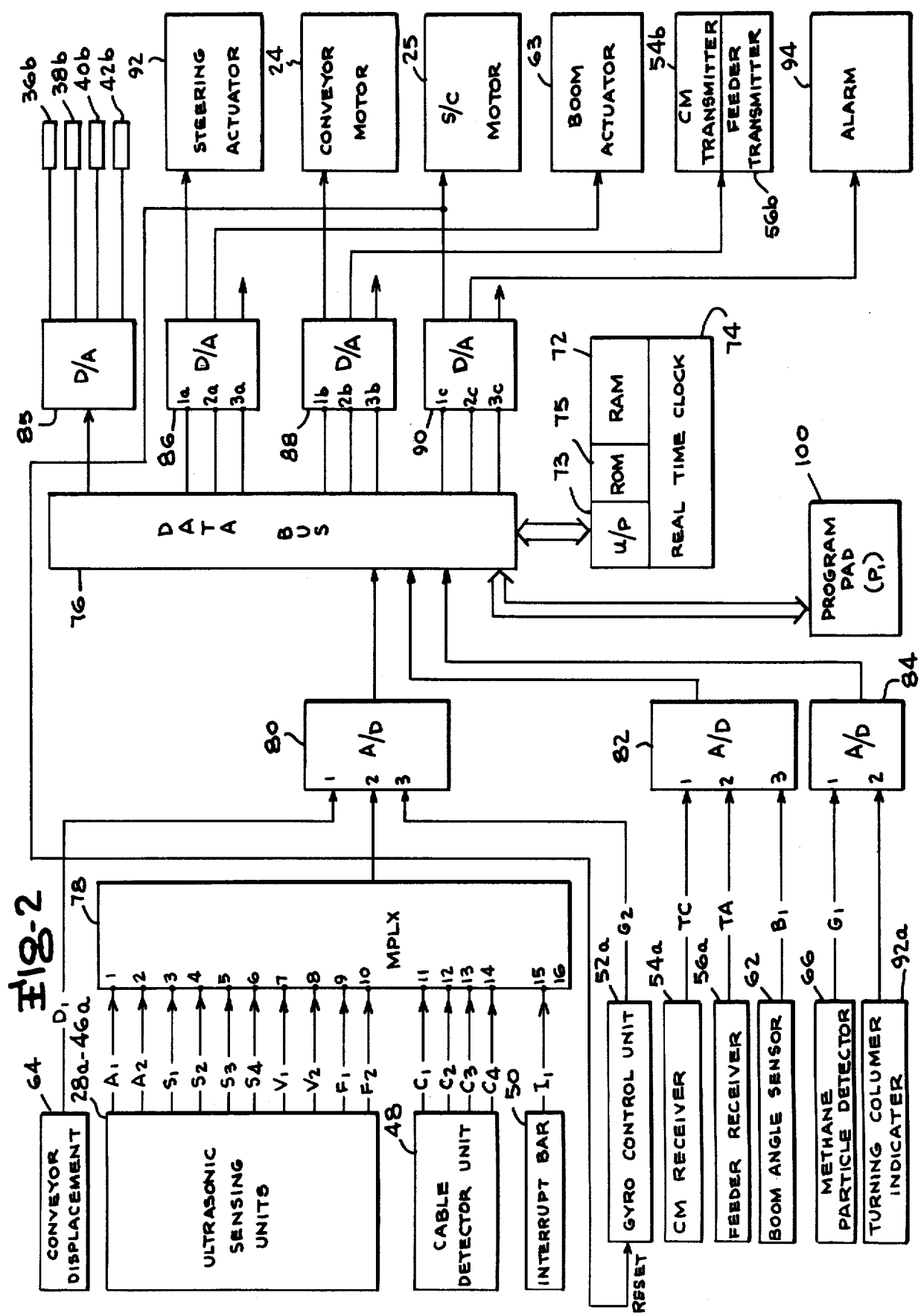

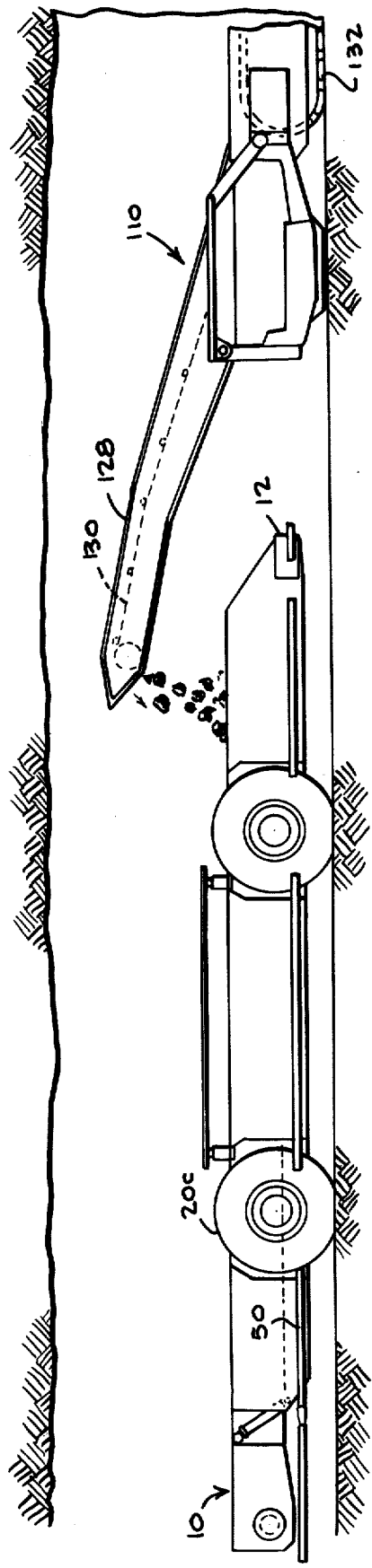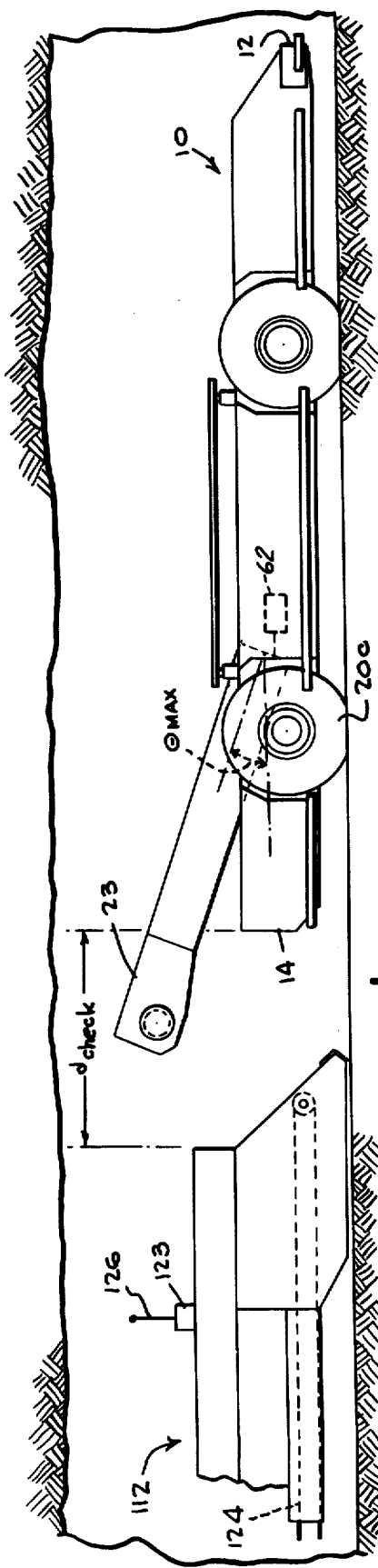

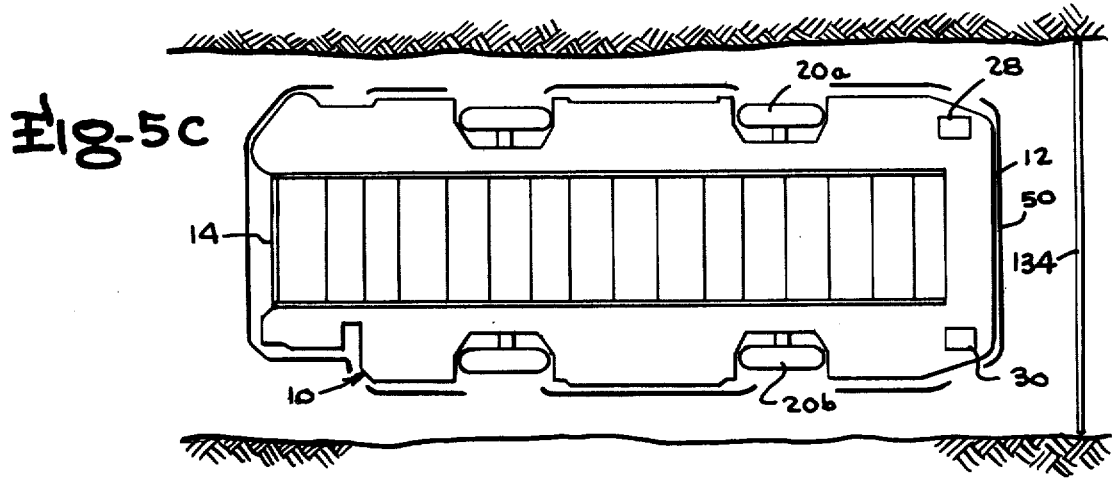
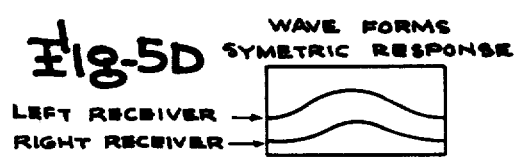 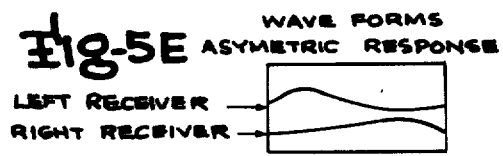
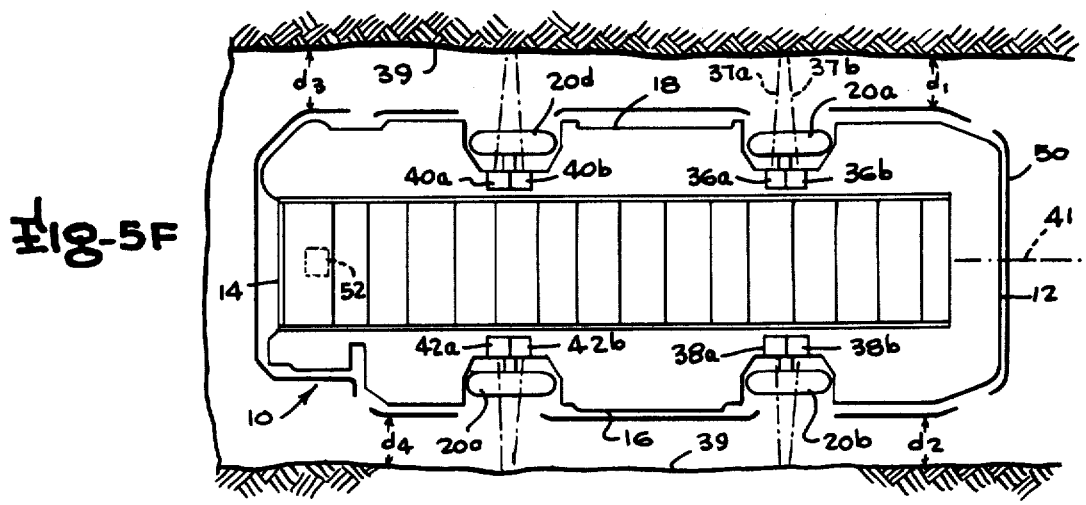
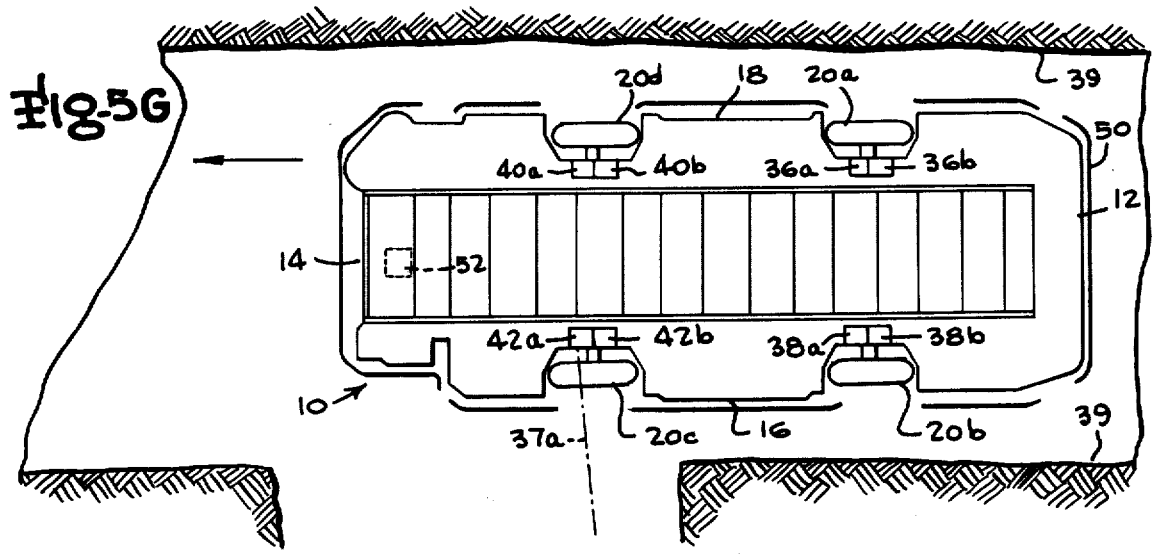

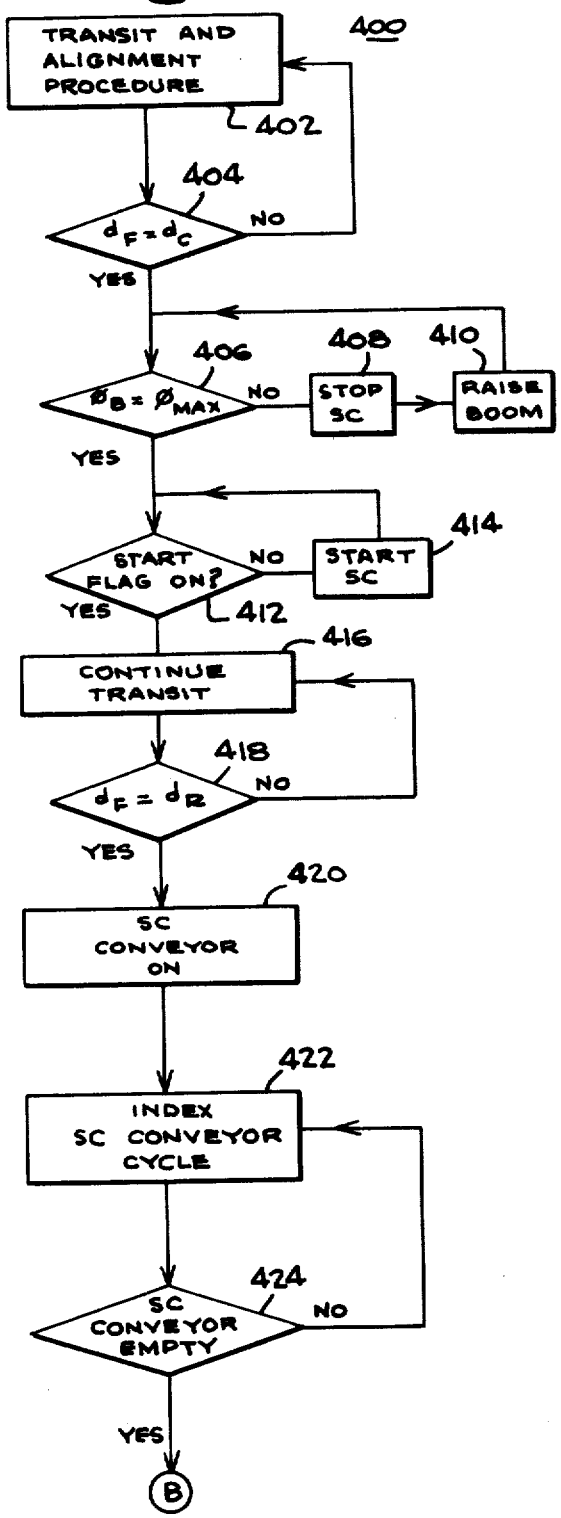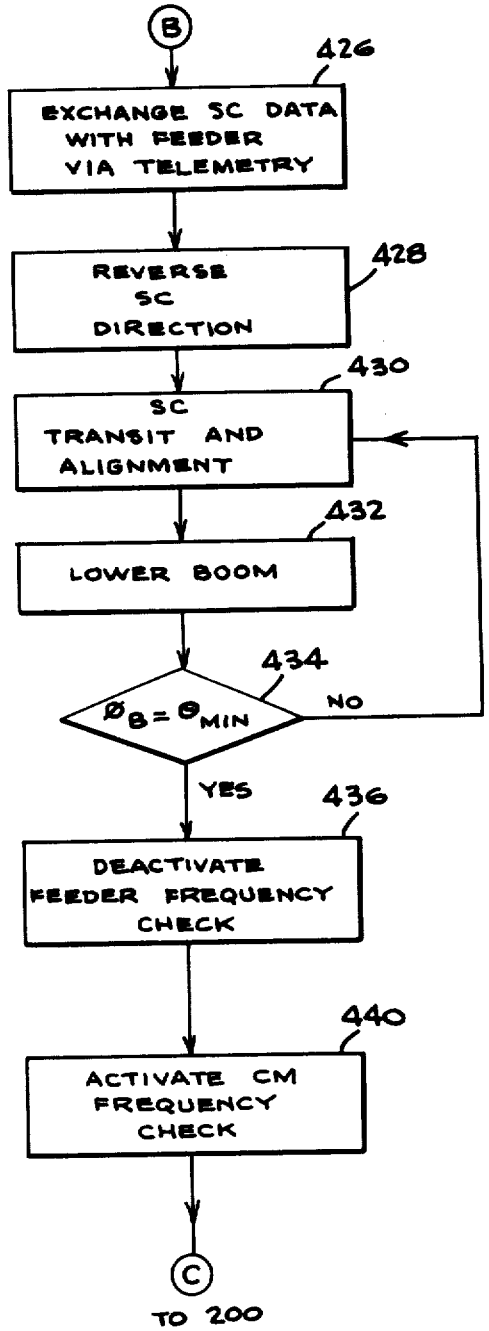

AUTOMATED OPERATORLESS VEHICLES

DESCRIPTION

Background of the Invention

This invention relates to automated operatorless vehicles and in particular to operatorless guidance control systems for such vehicles that permits the vehicle to be directed from a first point to a second point along a selected path.

Vehicle guidance systems of the prior art are generally divided into two categories. The first category of guidance systems employs guidance wires that are deployed within or on the surface upon which the vehicle is to traverse and serve to impart information that is sensed by the guidance system. A second type of guidance system employs elements for transmitting energy in the form of light or laser pulses, electromagnetic energy at radar frequencies or sound or sonar waves that are reflected from obstacles to be detected by receivers mounted upon the vehicle to provide control signals whereby obstacles are avoided.

Prior art automatic vehicle guidance systems of the first category have distributed guidance wires in various special-purpose continuous loop configurations. These are defined as configurations in which every route which the vehicle may have to traverse must be individually traced from start to finish, with all intermediate points in the proper order, by continuous loops consisting of a continuous guidance wire and its branches. Consequently, the guidance wire configuration of prior art systems have all the inflexibility of a fixed system of railroad tracks and sidings.

Normally, vehicle guidance wires are electrically excited to permit their detection by electromagnetic sensors on board the vehicle. This raises problems of electrical balance, which are particularly severe in continuous loop configurations requiring either that the vehicle be designed to operate over a wide range of guidance wire excitation levels, or that each of the many electrically parallel branch paths be individually trimmed by hand-adjustable impedances. Each subsequent addition of even a single new branch path then requires the retrimming of every impedance in the network.

U.S. Pat. No. 3,669,206 of Tax et al discloses such a guidance wire system wherein a guidance wire or conductor is disposed along the path or roadway between several loading areas that the vehicle is to visit. Steering signals are applied to the guidance wire and are sensed by two sensing elements mounted upon the vehicle transversely of the normal direction of vehicle movement. The sensing elements simultaneously sense a steering signal emanating from the guidance wire, and steering signal receivers respectively connected to the sensing elements generate corresponding output signals which are fed to a comparator circuit for generating an error signal in response to the difference of the two output signals. In turn, the error signal is applied to a steering control mechanism to effect vehicle guidance in a manner that the magnitude of the error signal is reduced toward zero. For a similar system see also U.S. Pat. No. 3,933,099 of Sieb.

In order to achieve greater flexibility than that provided by configured guidance wire systems as described above, the prior art has suggested the use of guidance wires that are laid out in the form of an X,Y coordinate grid to provide signals to a vehicle guidance system. Such a grid-type guidance wire system is disclosed in U.S. Pat. No. 3,612,206 of Ohntrup, which describes a system for guiding a vehicle such as a warehouse truck including a pair of count sensors that sense the coordinate wires as the vehicle moves across the X,Y grid of guidance wires to provide count signals as are accumulated and then stored in an intersection counter. The destination of the vehicle is set by a program selector and when a match between the destination and the current count is determined as by a coincidence circuit either a turn or stop command is effected as by corresponding control blocks. A further circuit is provided for maintaining the vehicle centered on one of the conductors, employing a pair of sensors each responsive to the electric field as generated by the conductor and a control circuit responsive to such signals to effect an appropriate steering change.

U.S. Pat. No. 3,744,586 of Leinauer discloses a guidance system for a self-propelled vehicle adapted to move back and forth along substantially parallel paths. The system employs a plurality of sensors disposed on the vehicle periphery to sense obstacle contact to bring the vehicle to a halt. In addition, the Leinauer system includes front sensors, a lateral sensor, a stop sensor and a rear sensor, each of which includes a coil responsive to alternating fields as established by a loop of conductive material disposed as a boundary obstruction about the area in which the vehicle is guided. Further, a transmitter and an array of sensors are mounted on the vehicle for detecting the presence of a reference surface, whereby the vehicle is directed along a path essentially parallel to that reference surface. In particular, the transmitter transmits a signal in the form of a light beam or an audio signal to be reflected from the reference surface and to be detected by one of the sensors dependent upon the angle of vehicle orientation with respect to the reference surface. If one of the sensors other than the centrally disposed sensor within the array, senses the reflected signal, a corresponding steering change is effected. If the centrally disposed sensor detects the reflected signal, there is provided an indication that the vehicle is proceeding on a path parallel to the reference surface.

A still further type of guidance system employs a gyro mechanism that orients the vehicle along a predetermined direction. U.S. Pat. No. 2,674,332 of Ovshinsky discloses such a system as being attached as an accessory to a vehicle such as a tractor to permit it to be directed back and forth in a series of parallel paths. The Ovshinsky control mechanism includes a drum upon which there is disposed a plurality of conductors, one for each of the paths back and forth, and a set of switches that are actuated to effect turns. In particular, an odometer drives the drum in one direction until a first switch closes at which time the drum stops rotating and a gyro mechanism is rotated on a table whereby the vehicle turn is effected. Upon completion of the turn, the drum is rotated in the opposite direction until a further switch is closed.

The present invention is more specifically directed toward a guidance system adapted for those vehicles such as shuttle cars employed in an underground environment such as a coal mine. Typically, a coal mine is dug to form a parallel grid of corridors having a plurality of intersection points with each other. In order to extract coal from the mine, a continuous miner is disposed in the vicinity of a mine face and moves from position-to-position as coal is extracted from the face. Further, a feeder is disposed remotely from the continuous miner to transport the dug coal from the undergound mine to the surface as by a conveyor belt. About 75% of United States underground coal mines now use vehicles such as shuttle cars to move the coal from the continuous miner to the feeder. The continuous miner is capable of producing 600 tons per hour and the feeder is capable of removing thousands of tons of coal per hour. In contrast, the largest shuttle cars now in use for coal production carry safe loads of about 10 tons, thereby creating a bottleneck between the continuous miner and the feeder. Many time studies have indicated that approximately 60% of the non-productive time at the working face of the continuous miner is directly attributable to the transportation system in which presently available shuttle cars are used. The greatest modification that must be made in the mining cycle to increase the efficiency of coal removal, is in the transportation system used to carry the coal from the continuous miner to the feeder.

Thus, it is desired to automate the guidance system of shuttle cars to thereby improve productivity and to provide optimum scheduling and control of the shuttle car haulage system. An automated shuttle car with an on-board computer eliminates the operator and thus results in lower manpower requirements for newly opened mines and/or a redistribution of labor in existing mines to other mining functions. Additionally, by using an automated shuttle car, one workman is removed from the face area where most injuries from roof falls occur.

Russian Pat. No. 673,825 discloses a mine transport or shuttle cars that is controlled by signals transmitted from a central or controlling station, whereby the mine transport is directed to and from a continuous mine or excavator along the previous path thereto.

Further, it is contemplated that an automated shuttle car would increase efficiency of coal transportation between the continuous miner and the feeder by eliminating lost time due to scheduling and human errors. To this end, it is contemplated in accordance with the teachings of this invention that a communication system would be established between an automated shuttle car and other such cars used within a mine and also with the continuous miner, to provide information as to the position of each such shuttle car and also of the continuous miner as it relocates in the process of extracting coal from the mine face.

SUMMARY OF THE INVENTION

It is therefore an object of this invention to provide a new and improved guidance system for an operatorless vehicle capable of guiding a vehicle selectively and variably between two points.

It is a more specific object of this invention to provide a new and improved vehicle control system for effecting vehicle guidance without the need of guidance wires.

It is a still further object of this invention to provide a new and improved vehicle guidance system particularly adapted for providing control of an operatorless vehicle and in particular a shuttle car as adapted for use in a mining environment.

It is a more specific object of this invention to provide a new and improved guidance control system for a shuttle car adapted to communicate with other such cars and with a continuous miner, whereby coal may be more efficiently transported between the continuous miner and a feeder without the need of an operator to guide the shuttle car.

These and other objects of the invention are accomplished in accordance with the teachings of this invention by a guidance control system particularly adapted for an operatorless vehicle comprising means for determining the presence of defined points along a selected path that the vehicle is to travel, memory means having a plurality of locations, each location for receiving one of a set of commands whereby the vehicle may be commanded to turn, pause or to continue its movement. Address means are responsive to the detection of a point for addressing the corresponding locations within the memory means, whereby a command stored therein is executed to effect vehicle control.

In an illustrative embodiment of this invention wherein the vehicle is adapted to traverse a set of corridors as would be found in a mine and the corridors are disposed respectively along X and Y directions to form thereby a series of intersection points, the sensing means is disposed upon at least one side of the vehicle to sense the presence of an intersecting corridor. i.e. the absence of a corridor wall. Upon sensing of an intersecting corridor, the address means accesses the location of the memory means corresponding to each detected point of intersection of the mine corridors to access the vehicle command stored at that location. The control guidance system includes a further or second memory for retaining the location of the vehicle in terms of its X,Y coordinate position within the grid of corridors, the output of the sensing means serving to update the current vehicle position as stored in the second memory. Upon reaching an intersection of corridors, the second memory is also updated to the current location of the vehicle.

In a further aspect of this invention, sensors are disposed on opposing sides of the vehicle, whereby signals are transmitted to be reflected by the adjacent walls of the corridor and to be detected by corresponding receivers disposed on the sides of the vehicle. The delay between transmission and reception of the signals indicates the distance between the side of the vehicle and the corridor wall. Further, a difference between the distances between the vehicles sides and the corridor walls, is obtained and when this difference approximately equals to zero, the shuttle car is known to be at the median of the corridor.

In a more specific embodiment of this invention, a pair of front transmitter/receivers as described above is disposed over the front wheels of the vehicle, and a pair of transmitter/receivers is disposed over the rear wheels of the vehicle. As the vehicle approaches a corridor intersecting that corridor along which the vehicle is travelling, the front transmitters will provide at least one signal indicating the absence of a corridor wall or a large distance thereto, whereby the difference between the outputs of the front and rearwardly disposed transmitter/receivers is great, i.e. indicating that the intersecting corridor has been reached.

In a further feature of this invention, the vehicle guidance control system upon sensing the presence of an intersecting corridor, provides a signal that the vehicle has reached the next intersection or coordinant point within the X,Y grid of the intersecting corridors, at that time, the second or X,Y memory is assessed to determine the location of the vehicle and the corresponding location within the first memory means is addressed to determine the command to be then executed. If a turn command is assessed, suitable control signals are applied to the steering actuator of the vehicle whereby a turn is effected. After the turn is made, a signal or flag is set within a location of the memory means indicating the new direction that the vehicle is being directed. The flag so set serves to control which of the X or Y counts as stored in the second memory means is to be incremented.

In a still further feature of this invention, upon reaching the next intersection or X,Y point, that location within the first memory means is addressed and if there is a null or no strategy command, the shuttle car's guidance system issues a command to the vehicle's gyro control unit to lock the steering actuator to the present vehicle course, whereby the vehicle is guided through the intersection of the corridors until signals are again received from the transmitter/receivers disposed on the sides of the vehicle, at which time the above described alignment procedure for maintaining the vehicle course along the corridor median is again reimplemented.

The main or first memory means stores a "wait and see command" that permits the vehicle to be brought to a halt while communication is established between a first or master vehicle and a second or slave vehicle. In the illustrative embodiment, wherein at least first and second vehicles are used to transport coal between a continuous miner and a feeder, one of the vehicles is brought to a halt and commands are issued to a data transmitter thereon to transmit a request for data to the other vehicle. The data that is to be retransmitted may include data as to the present location of the continuous miner; in that regard it is noted that, the position of the continuous miner changes as coal is being dug from the mine face, and the transmitted data will permit the requesting vehicle to proceed to the new position of the continuous miner.

In a still further feature of this invention, first and second transmitter/receivers are disposed upon the loading end of the vehicle and are used to sense the presence of an obstacle as opposed to a curtain that would be disposed across a corridor to stop or deflect gaseous currents. Each transmitter directs energy signals taking the form of sound waves and/or light waves to be reflected from the obstacles, and the curtains. The reflected signals are sensed by the receivers to provide output signals, which are compared with each other and if the output signals have symmetric waveforms, a determination is made that a curtain having a relatively flat surface is disposed in front of the vehicle. On the other hand, if nonsymmetric responses are obtained from the receivers, the guidance system is informed that a curtain is not present but some other obstacle, e.g. a man or machine, is present and the vehicle is brought to a halt.

DESCRIPTION OF THE DRAWINGS

These and other objects and advantages of the present invention will become more apparent by referring to the following detailed description and accompanying drawings in which:

FIG. 2 is a functional block diagram of the computer architecture of the vehicle guidance control system for the vehicle shown in FIG. 1;

FIG. 5A illustrates the relationship of the automated operatorless vehicle of FIG. 1 as it unloads coal into a feeder;

FIG. 5B illustrates the manner in which a continuous miner loads coal onto the automated operatorless vehicle as shown in FIG. 1;

FIG. 5C shows a plan view of the automated operatorless vehicle as shown in FIGS. 1A, B and C as it would sense the presence of a curtain disposed within one of the corridors as shown in FIG. 4;

FIGS. 5D and E show respectively symmetrical and asymmetrical waveform responses of the outputs of the forward (or aft) ultrasonic receivers;

FIGS. 5F and G shows a plan view of the automated operatorless vehicle as shown in FIG. 1, with a plurality of transmitter/receivers disposed on opposing sides thereof to provide signals used to guide the vehicle along the corridor median;

FIGS. 9A and B show a more detailed, lower level flow diagram of the feeder docking mode or subroutine generally shown in FIG. 6;

DESCRIPTION OF A PREFERRED EMBODIMENT

Figure 1A:
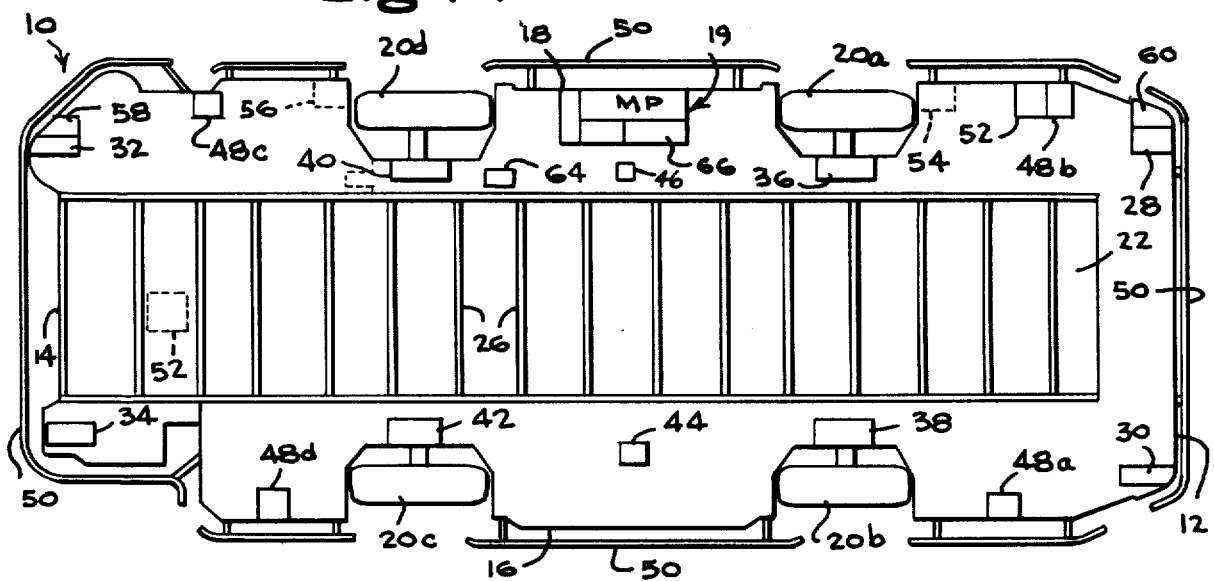
FIGS. 1A, B and C are respectively plan views and a side view of an automated operatorless vehicle or shuttle car in accordance with the teachings of this invention.

Referring now to the drawings and in particular to FIGS. 1A and B, there is shown an automated operatorless vehicle in the form of a shuttle car 10 into which a vehicle guidance control system 19 is incorporated in accordance with the teachings of this invention. FIG. 1A particularly, shows generally the vehicle guidance control system 19 and a plurality of transmitters and sensors for variously receiving signals that are used to effect guidance of the shuttle car 10 along a selected, variable path between first and second points. The placement of the various sensors is specifically shown in FIG. 1A. The structure of the shuttle car 10 is well-known in the art and is illustrated more specifically in FIG. 1B. The shuttle car 10 includes four independently steerable wheels 20, each driven by a traction or car motor 25. As seen particularly in FIG. 1B, there are two motors 25 each coupled by its drive linkage 27 to a set of wheels 20 upon one side of the car 10. The shuttle car 10 further includes a conveyor 22 formed as a continuous loop and extending along the axial length of the car 10 for receiving coal. The conveyor 22 is driven by a conveyor motor 24 thereby permitting coal to be distributed along the length of the conveyor 22.

As shown in FIG. 1A, the shuttle car 10 has a forward-end 12 and an aft-end 14, and opposing sides 16 and 18. A pair of forwardly positioned transmitter/receivers 28 and 30 are disposed upon the forward-end 12. As will be explained each transmitter/receiver includes a distinct transmitter for transmitting an energy signal taking the form of light, ultrasonic sound or radiation in the radar frequency, forwardly of the shuttle car 10 to be reflected by objects in the path of the vehicle 10 to be received by a receiver, whereby a signal is generated indicative of that object, as will be explained in detail later. A similar pair of transmitter/receivers 32 and 34 are disposed upon the aft-end 14 of the shuttle car 10 for sensing objects to the rear of the shuttle car 10. In the contemplated embodiment of this invention in which the shuttle car 10 is particularly adapted to transport coals between a continuous miner and a feeder within a coal mine, the shuttle car 10 proceeds in a forward direction, for example, from the feeder to the continuous miner and without turning around, proceeds from the continuous miner to the feeder; thus, the aft-end 14 of the shuttle car would be the leading end of the car 10 as it proceeds in at least one direction and its transmitter/receivers 32 and 34 would then switch function to detect those objects in front of the shuttle car 10. A first pair of side transmitter/receivers 36 and 40 are disposed upon a first side 18 of the shuttle car 10. Each such transmitter/receiver transmits a signal energy from its transmitter taking the form illustratively of ultrasonic sound to be reflected by the surface of the corridor wall back to the corresponding receiver. Each transmitter/receiver includes a comparison circuit, well-known in the art, for determining the time of transmission whereby the distance from the side 18 of the shuttle car 10 to the corridor wall may be determined and a signal provided indicative thereof to the vehicle guidance system 19, as will be explained in more detail with respect to FIG. 2. A similar set of side ultrasonic transmitter/receivers 38 and 42 are disposed upon the opposing, second side 16 of the shuttle car 10. As will be explained, the four side transmitter/receivers 36, 38, 40 and 42 provide signals to the vehicle guidance system 19 to maintain the shuttle car 10 along the median of a corridor, as well as to detect the presence of an intersecting corridor.

The shuttle car 10 also includes a plurality of sensor-type devices that specifically relate to the coal mining functions. For example, a pair of vertically positioned transmitter/receivers 44 and 46 are disposed on the side 16 of the car 10 to sense the position of a boom 128 of a continuous miner 110 as more fully shown in FIG. 5B. As will be explained, the continuous miner 110 is disposed at the face of the mine for extracting coal therefrom, the coal is carried by the boom 128 as it is positioned over the shuttle car 10, the transmitter/receivers 44 and 46 serving to sense the position of the boom 128 and to provide signals whereby the boom 128 may be positioned to accurately dispose coal into the conveyor 22 of the shuttle car 10. Each of the transmitter/receivers 44 and 46 includes a transmitter that transmits in a vertical direction ultrasonic sound to be reflected by the boom 128 and received by the corresponding receiver. Each such transmitter/receiver also includes a correlation circuit (not separately shown), whereby the signals from both transmitter/receivers 44 and 46 are compared to determine when the boom 128 is directly positioned over the conveyor 22.

In addition, the shuttle car 10 includes four cable detectors 48a, b, c, and d respectively disposed over the four corners of the shuttle car 10 to sense a magnetic field as generated by the high-powered cables that serve to supply electrical energy to the components and, in particular, the car motors 25 of the shuttle car 10. In particular, the cable detectors 48 provide warning signals indicative of the presence of such high-power cables to prevent the shuttle car 10 from running over them. An interrupt bar 50 is disposed about the periphery of the shuttle car 10, and has illustratively four segments, each segment being disposed upon the forward-end 12, the aft-end 14 or the sides 16 and 18 of the shuttle car 10; each segment of the interrupt bar 50 includes (not illustrated) a contact bar and a switch mechanism such that upon contact with an obstacle, that a corresponding switch mechanism 50 is closed to provide an interrupt signal to the vehicle guidance control system 19, whereby the shuttle car 10 is brought to an abrupt halt.

The shuttle car 10 is equipped with a gyro control unit 52 that is coupled to the vehicle guidance control system 19 and serves to orient the direction of the vehicle 10; as will be explained, the gyro control unit 52 may be programmed with a given orientation for the vehicle 10 and upon actuation provides signals indicative of angular deviation from that programmed orientation to the vehicle guidance control system 19. As will be explained in greater detail, the gyro control unit 52 is utilized to control the shuttle car 10 as it traverses across an intersection of two corridors, when the side transmitter/receivers 36, 38, 40 and 42 may not otherwise be used to control vehicle direction. The shuttle car 10 has means in the form of a continuous miner telemetry unit 54 and a feeder telemetry unit 56 for establishing communication respectively with the continuous miner 110, as more fully shown in FIG. 5B, and a feeder 112, as more fully shown in FIG. 5A, for transmitting desired information to and from each. For example, as the continuous miner 110 proceeds to extract coal from a mine face it changes its position continually. Thus, for an approaching shuttle car 10 to be directed to the moving continuous miner 110, updated data indicating the present position of the continuous miner 110 needs to be transmitted to the shuttle car 10 at the "wait and see" point. Updated position data is transmitted via the continuous miner telemetry unit 54 to the vehicle guidance control system 19. As will be elaborated on, the continuous miner telemetry unit 54 operates upon a first or continuous miner frequency, whereas the feeder telemetry unit 56 operates upon a second, feeder frequency. Each of the continuous miner telemetry unit 54 and the feeder telemetry unit 56 is associated with its corresponding continuous miner antenna 58 and feeder antenna 60.

As shown in FIG. 5A, the shuttle car 10 includes a boom 23 that is articulated about a pivoting point to permit the boom 23 to be raised and lowered with respect to the conveyor 22. The boom 23 has associated therewith a boom angle sensor 62 taking illustratively the form of a potentiometer coupled to the boom 23 and having a variable resistance indicative of the angle of the boom 23. In addition, there is included a boom actuator or motor 63 for disposing the boom 23 between a rest position wherein the boom 23 is disposed substantially horizontal with respect to the remaining part of the conveyor 22 as shown in FIGS. 1A and B and a raised position as shown in FIG. 5A. The boom actuator 63 is disposed at the aft 14 of the shuttle car 10 and illustratively comprises as is well-known in the art, a hydraulic motor for forcing a hydraulic fluid into a cylinder 65 coupled with a lever arrangement for raising the boom 23. Further, there is included a conveyor displacement sensor 64 coupled to the conveyor motor 25 for measuring the load or current drawn thereby to provide a signal indicative of the load imposed upon the conveyor motor 24 and therefore the amount of coal that has been loaded onto the conveyor 22. In addition, the shuttle car 10 includes a gas and/or particle detector 66 whereby possible dangerous gases, e.g. methane, may be detected.

Referring now to FIG. 2, there is shown a functional block diagram of a computer implementing the vehicle guidance control system 19 of this invention. A program for processing the inputed data as derived from the sensors described above in detail with respect to FIG. 1A, for supplying output control signals to effect guidance of the shuttle car 10 including guidance of the wheels 20, and also for causing appropriate data to be transmitted by the CM transmitter 54b and the feeder transmitter 56b, is stored in a read-only-memory (ROM) 75 as shown in FIG. 2. Flow diagrams of the programs so stored are described in detail below with respect to FIGS. 6 to 11. These programs are executed by a microprocessor 73 coupled with the ROM 75 and a random access memory (RAM) 72, and a real-time clock 74. Noting generally the array of sensors as coupled to apply inputs to a data bus 76, it is necessary to sample these input signals from each of these above described sensors on a real-time basis; to this end. the real-time clock 74 samples under control of the microprocessor 73 the sensors as their data is needed. In an illustrative embodiment of this invention, the microprocessor 73 and the ROM 75 may take the form of a "processor" as manufactured by ROLM Corporation under their designation 1603A. The real-time clock 74 may illustratively take the form of a "real-time clock" as manufactured by ROLM Corporation under their designation 3504.

As shown in FIG. 2, each of the conveyor displacement sensors 64, of the receiver (or sensing unit) as designated by the letter "a" of the transmitter/receivers 28, 30, 32, 34, 36, 38, 40 42, 44 and 46, the cable detectors 48 and the interrupt bar 50 are coupled to corresponding inputs of a multiplexer 78, to be time-multiplexed under the control of the real-time clock 74. An output of the multiplexer 78 is applied to an input of the analog-to-digital (A/D) converter 80 whereas outputs of the conveyor displacement sensor 64 and of the gyro control unit 52 are applied to other inputs of the A/D converter 80. Further inputs are derived from the CM receiver 54a, the feeder receiver 56a and the boom angle sensor 62 and applied to a further A/D converter 82. The output of the gas and particle detector 66 and of a turn column indicator 929 associated with a steering actuator 92, are applied to an A/D converter 84. The turn column indicator 92a provides an indication of the angle of rotation of the column associated with the storing actuator 92 for turning the vehicle wheels 20. Digital output signals as derived from each of the A/D converters 80, 82 and 84 are applied to the data bus 76 to be processed by the microprocessor 73. In an illustrative embodiment of this invention, the A/D converters 80, 82 and 84 may take the form of a converter as manufactured by ROLM Corporation under their designation 3656.

Figure 1B:
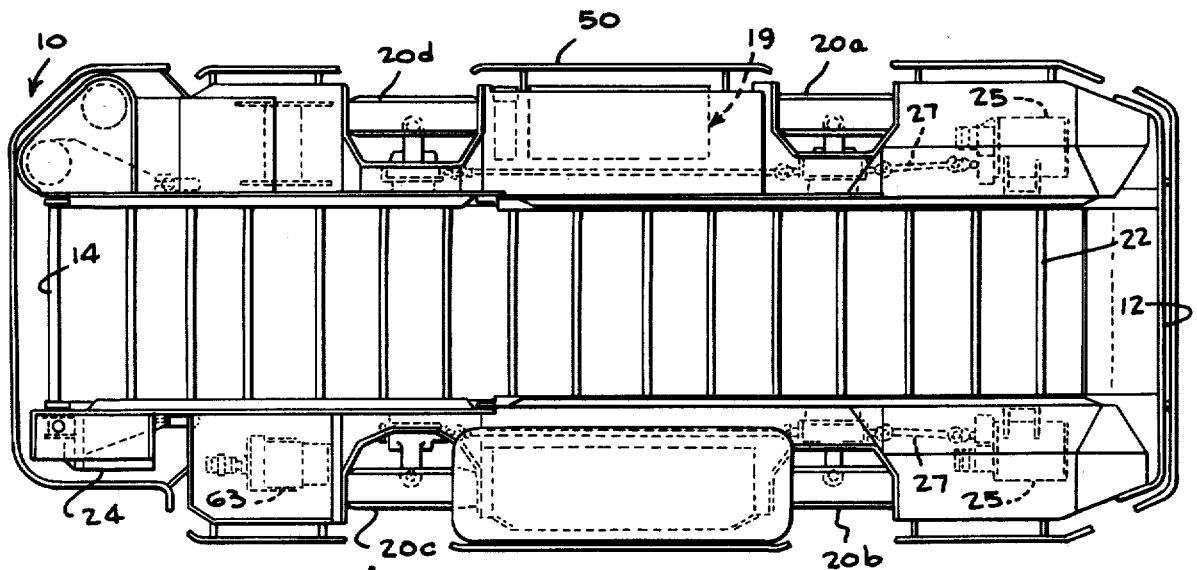
Figure 1C:
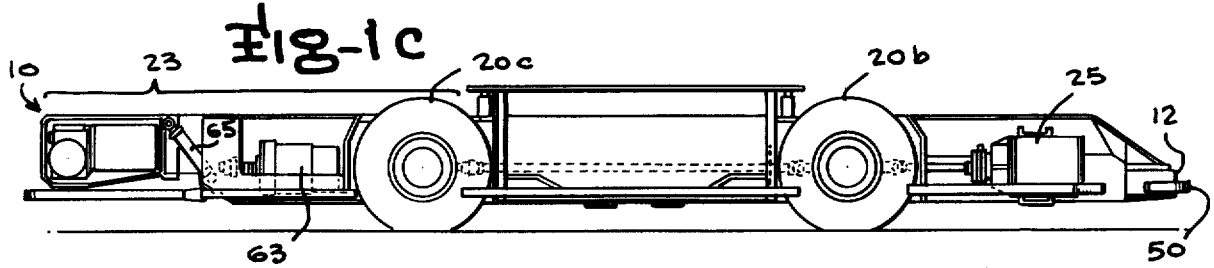

Output signals are developed as a result of the processing by the microprocessor 73 of the program stored in the RAM 72, and are applied as shown in FIG. 2 via the data bus 76 to corresponding of a plurality of digital-to-analog (D/A) converters 86, 88 and 90. The analog outputs of the D/A converter 86 are applied respectively to the steering actuator 92, and the boom actuator 63. As is well-known in the art, the steering actuator 92 effects control of each of the wheels 20 as shown in FIG. 1B. It is contemplated that the steering actuator 92 could be an add-on device that is attached to the steering wheel of the shuttle car 10, as shown in FIG. 1, or could be a separate mechanism that develops signals to be applied to the column coupled to the car wheels 20. The boom actuator 63 takes the form of a motor, as shown in FIG. 1A, for moving the boom 23 between a substantially horizontal position as shown in FIG. 1B and a raised position as shown in FIG. 5A, whereby coal may be transported into a feeder 112, as shown in FIG. 5A. Similarly, the D/A converter 88 applies analog output signals to the conveyor motor 24, the CM transmitter 54b and the feeder transmitter 56b. The conveyor motor 24 upon actuation serves to advance the conveyor 22, whereby the coal as disposed thereon may be evenly distributed along the length of the conveyor 22 and, upon raising of the boom 23, the coal may be carried by a series of equally spaced conveyor ridges to a position above and then dropped into the feeder 112. The CM transmitter 54b and the feeder transmitter 56b are a part of the transmitter/receivers 54 and 56 and serve to transmit data upon first and second carrier frequencies uniquely corresponding to each of these transmitters; in particular, the CM transmitter 54b transmits a signal to a receiver of the continuous miner 110 to establish a hand-shaking relationship, i.e. initiates the transmission from the continuous miner transmitter of a signal indicative of its current position. In addition, the transmitter of the continuous miner 110 may also transmit data in the form of docking instructions, whereby the shuttle car 10 is brought into a docked relationship with the continuous miner 110, as will be explained in detail later. In similar fashion, the feeder transmitter 56b transmits data to the receiver of the feeder 112 to initiate transmission from the feeder transmitter. It is contemplated that the feeder transmitter sends docking data whereby the shuttle car 10 is brought into a docked relationship with the feeder 110. In addition, the feeder transmitter 56b transmits ventilation data indicative of the gas or particles as sensed by the detector 66 and intermediately stored in the RAM 72 of the microprocessor 73. Upon docking, the feeder transmitter 56b transmits such data indicative of the distribution, for example, of particles or gas throughout the mine or at least of the path that the shuttle car 10 has taken from the feeder 110 to the continuous miner 112, to the feeder receiver 123, whereby the ventilation data is retransmitted to the surface. In similar fashion, the D/A converter 90 transmits analog control signals to each of the car or traction motor 25, to a reset input of the gyro control unit 52 whereby the reference vector direction may be reset or "retorqued", and to an alarm 94. As is well recognized in the art, the actuating signals applied to the motor 25 serve to activate and to stop the motor 25. Upon actuation, the alarm 94 provides a manifestation in the form of an audio sound, that the forward or aft transmitter/receivers 28 or 30, or 32 or 34 have detected the presence of an obstacle in front of the shuttle car 10 or that some object has tripped the interrupt bar 50. In addition to actuating the alarm 94 upon the sensing of an obstacle in the path of the shuttle car 10, the actuating signals as applied to the traction motor 25 are removed, thus bringing the shuttle car 10 to a halt. In addition, there is included a program pad 100 that will be explained later in detail with respect to FIG. 3, whereby various commands may be entered into the RAM 72 of the microprocessor 73. The D/A converters 86, 88, and 90 may illustratively take the form of that digital-to-analog converter as manufactured by ROLM Corporation under their designation No. 3650A.

Figure 4:
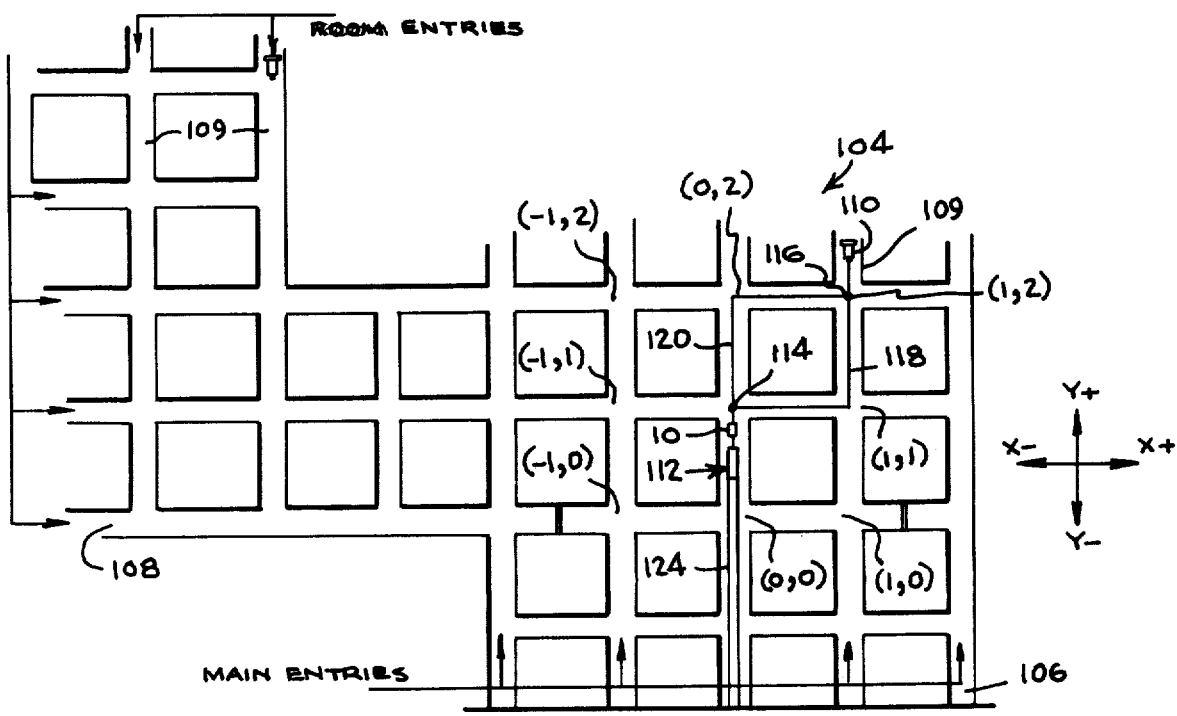
FIG. 4 is a map of a set of corridors as found in a coal mining environment for which the automated operatorless vehicle control system as shown in FIG. 1 is adapted to traverse between beginning and terminating points.

Referring now to FIG. 4, there is shown an underground mining configuration commonly known as a room and pillar system 104. This system 104 comprises a plurality of tunnels typically called main entries 106 dug into a coal bed from the mine entrance. Sets of further tunnels known as subentries 108 are then dug into the bed from the main entries 106. Set of roomentries 109 are dug into the bed of coal from the subentries 106. Such a configuration of mine entries 106 and subentries 108 form a plurality of pillars that are left standing in all the entries to support the mine roof. As the room entries 109 are expanded, large panels of coal are created. Eventually, underground rooms are dug into the panels of coal to recover the coal from the coal bed, the exposed surface of the bed being known as a face. As shown in FIG. 4, the corridors or main entries 106 are disposed substantially parallel to each other, the main entries 106 being separated from each other by pillars of coal 40 to 80 feet wide. Similarly, the corridors or subentries 108 are cut along substantially parallel paths, each subentry 108 being substantially perpendicular to a main entry 106; the subentries are typically spaced every 40 to 80 feet, whereby square or rectangular pillars of coal are formed by the main entries 106 and the subentries 108. A conveyor 124 as shown in FIGS. 4 and 5A, is built along one of the main entries 106 to carry coal from the feeder 112 (see FIG. 5A for a side illustration thereof) to an access passage whereby the coal may be removed from the mine.

The shuttle car 10 moves under the control of the vehicle guidance control system 19 of this invention from the feeder 112, as shown in FIG. 4, along selected of the main entries 106 and subentries 108 to the continuous miner 110. The continuous miner 110 is disposed within one of the room entries 109 to dig coal from the face of the coal bed. The continuous miner 110 is more fully shown in FIG. 5B. Significantly, the continuous miner 110 has the capability of moving with respect to the mine face to more efficiently dig coal therefrom, whereas the feeder 112 is disposed in a relatively stationary position. As will be explained, the vehicle guidance control system 19 of this invention permits transmission of data from the continuous miner 110 to the shuttlecar 10 to provide data indicative of the updated, new position of the continuous miner 110.

The manner in which guidance instructions are imparted to the vehicle guidance control system 19 of this invention is related to the layout of the mine system 104 as shown in FIG. 4. In particular, the plurality of parallel disposed main entries 106 and the substantially perpendicular subentries 108 form a grid having a set of X,Y coordinates as designated by the coordinate values 0,0; 0,1; 1,1, etc. as shown in FIG. 4. In particular, the RAM 72 of the microprocessor 73 is organized in a corresponding manner so that a set of commands may be addressed in accordance with the coordinates X,Y of the grid system. The commands are stored in a plurality of locations of the RAM 72 to be addressed and executed by the microprocessor 73 to cause the shuttle car 10 selectively to turn, pause ("wait and see"), or to null, i.e. to continue in motion as it previously had. Before operation, the initial position and vector direction of the shuttle car 10 are placed into the RAM 72 of the microprocessor 73 and as the shuttle car 10 proceeds from that initial point, the current location of the shuttle car 10 in terms of its current X,Y position with mine system 104 is periodically updated and stored in a dedicated location of X,Y counter of the RAM 72. As will be explained in detail later, as the shuttle car 10 enters an intersection of the corridors 106 and 108, the side transmitter/receivers 36, 38, 40, and 42 serve to detect the presence of that intersection and update the present car position as stored in the X,Y counter or RAM 72. The direction of the shuttle car 10 is indicated as a vector along one of the coordinates directions a $+Y, -Y, +X$, or $-X$, as illustrated by the designated arrows of FIG. 4. The initial vector direction, whether $+Y, -Y, +X$ or $-X$, and the shuttle car starting point are initially programmed into the RAM 72 via the program pad 100, in a manner that will be more fully explained. Illustratively, the contemplated 2-dimensional array of storage locations may be configured into software as DIM S(5,5) thus defining 25 points in the memory array of the RAM 72 corresponding to 25 intersection points in the mine system 104, e.g., $S(0,0)$, $S(-1,0)$, $S(1,0)$, $S(-1,1)$, $S(0,1)$, etc.

An illustrative set of commands will now be explained with respect to FIG. 4. Initially, before the shuttle car 10 begins operation, its present location within the X,Y coordinate of the system 104 and vector direction are set. With the shuttle car 10 initially heading in the Y+ direction from its position 0,0, as shown in FIG. 4, the RAM 72 would be programmed simply as $S(0,0) = I, Y+$, i.e. the car 10 is located between 0,0 and 0,1 coordinates. For example, an instruction $S(0,0) = F, Y-$ could be set in the RAM 72 to indicate that the feeder 112 is in the Y— direction from the mine system coordinates 0,0. An instruction, $S(1,2) = C, Y+$ indicates that the continuous miner 110 is in the Y+ direction from the mine system coordinate 1,2 as shown in FIG. 4. An instruction $S(0,1) = W$ indicates that a "wait and see" point is disposed at the mine system coordinate 0,1. As shown in FIG. 4, the shuttle car 10 is thus programmed to proceed from its initial point and to be brought to a halt at the mine system coordinate point 0,1 to wait for a period of time during which transmission data takes place between shuttle car 10 and either of the feeder 112, the continuous miner 110, or a second shuttle car. An instruction $S(1,1) = T, Y+$ indicates that the shuttle car 10 is programmed to make a left-hand turn as it proceeds along a first path 118. More specifically, FIG. 4 illustrates that the shuttle car 10 is selectively programmed to proceed from the feeder 112 toward the continuous miner 110 along the first path 118 (or second path 120) and to make a return trip along the same path 118 (or 120) to the feeder 112 to prevent entanglement of the cable (not shown) connected to energize electrically the shuttle car 10. If the other car is proceeding along the return path 120 from the continuous miner 110 to the feeder 112, an instruction, $S(0,2) = T, Y-$ indicates that the car is to make a left-hand turn when it reaches the coordinate point 0,2. As will be explained later, the shuttle car 10 may be programmed to make other than 90° turns through either acute or obtuse angles. If it was desired to have the shuttle car 10 proceed through the intersection at system coordinate point 0,1, a command, S(0,1)=N would be programmed into the RAM 72 of the microprocessor 73.

As can be seen from above, the notation indicated by the letters T, W, and N define strategies or commands corresponding to a turn, a "wait and see", and a null or no command. If a turn command is programmed, as indicated by the letter "T", a routine (to be explained later in detail with respect to FIG. 10) is executed to apply control signals indicative of the direction of steering of the wheels of the shuttle car 10, to its steering actuator 92 and to coordinate the operation of the steering actuator 92 with the signals as obtained from the side transmitter/receivers 36, 38, 40, and 42. After the turn is made, a flag indicative of one of the vector directions X+,Y−, X−, or Y+ is set to indicate the new direction in which the shuttle car 10 is to proceed. If there is a null or no strategy command as indicated by the notation of the letter "N", the microprocessor 73 accesses the output of the gyro control unit 52 to provide a vector direction signal and to maintain the previous orientation of the shuttle car 10 until signals are again received from the side transmitter/receivers 36, 38, 40, or 42 indicating that the shuttle car 10 has passed through an intersection of corridors and has entered into the next entry or corridor, at which time the vehicle guidance system 19 again assumes an aligning process whereby the shuttle car 10 is maintained on the corridor median.

If a "wait and see" command is programmed as indicated by the notation "W", two procedures may be implemented corresponding to either a "noncommon haulage" arrangement or a "common haulage" arrangement. In the "noncommon haulage" arrangement, there are two shuttle cars 10 that operate between the feeder 112 and the continuous miner 110, each shuttle car 10 moving back and forth along two distinct paths 118 and 120 as shown in FIG. 4. In such a mode, each shuttle car 10 is proceeding only along its distinct path and it is not necessary to instruct the vehicle guidance control system 19 to take evasive moves so as to avoid the other of the shuttle cars 10. The first shuttle car 10 to reach its "wait and see" point comes to a stop and begins to transmit from its CM transmitter 54b a ready signal to the other or second shuttle car to establish a "handshaking" relationship therewith, whereby the CM transmitter 54b of the second shuttle car 10 transmits at a second frequency the requested data to the first master shuttle car 10. As indicated above, such transmitted data may involve the new, current position of the miner 110. For example, a shuttle car leaving the continuous miner 110 has obtained data as to the present position of the continuous miner 110 and transmits the position data at its "wait and see" point to the other shuttle car 10. As seen in FIG. 4, the "wait and see" point of the first shuttle car 10 would be 1,0 and that of the second shuttle car 10 would be 0,1. The current data position of the continuous miner 110 is stored in a known location of the RAM 72 and would be accessed under the control of the microprocessor 73, when the "hand-shaking" relationship with the second shuttle car 10 had been established. After the transmission from the first shuttle car 10 has been finished, its transmitter 54b transmits an end of data signal indicating that transmission has been completed, whereby both the first and second shuttle cars 10 proceed toward their next destinations, i.e. the first shuttle car 10 proceeds along path 120 toward the feeder 112, whereas the second shuttle car 10 proceeds toward the continuous miner 110 along path 118.

If no strategy or command is stored at a memory location within the RAM 72 of the microprocessor 73, such absence is an indication that a null strategy or command is desired. If a null command is so programmed, the microprocessor 73 accesses the gyro control unit 52 and uses the vector direction as established as determined thereby to control the vehicle direction by applying suitable steering signals to the steering actuator 92, as shown in FIG. 2, whereby the shuttle car 10 is directed across the intersecting entry or corridor. Upon traversing the intersecting corridor as detected by the side transmitter/receivers 36, 38, 40 and 42, the microprocessor 73 again responds to the outputs of the side transmitter/receivers to maintain the shuttle car 10 along the median of the corridor or entry.

Figure 3:
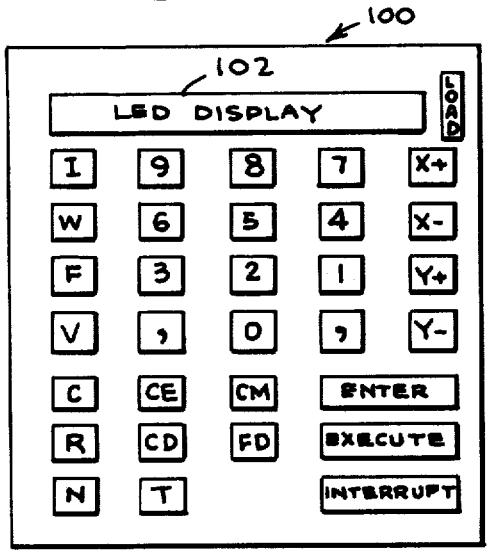
FIG. 3 is a plan view of a program pad for providing operator input to the vehicle guidance control system as shown in FIG. 2.

Referring now to FIG. 3, there is shown the shuttle car program pad 100 whereby the vehicle operator may enter commands into the RAM 72 of the microprocessor 73, the RAM 72 being addressable in accordance with the set of coordinate points as shown in FIG. 4, wherein each coordinate point is associated with a command or strategy as explained above. The key marked "I" is dedicated to setting the coordinates of the initial starting into the RAM 72 of the microprocessor 73. After depressing the button "I", the operator then enters numerical values of the X,Y coordinates by depressing successively one of the numerical keys 0–9. For example, the initial starting point could be entered by pressing keys I, 0,1 to thereby assign the starting point as having a 0,X coordinate and a 1,Y coordinate. The "F" and the "C" keys are dedicated respectively to entering the X,Y coordinate positions of the feeder 112 and the continuous miner 110 as shown in FIG. 4, in a manner similar to that described above with respect to the initial starting point. The "W", and "T" keys are respectively dedicated to entering commands or strategies corresponding to those coordinate points at which a "wait and see" or a "turn" command is to be executed. For example, the "wait and see" command would be entered into the RAM 72 by first depressing the "W" key followed by depressing two numerical keys corresponding to the X and Y coordinates at which that "wait and see" command is to be executed. The initial programming of the RAM 72 would include establishing the initial starting point and setting into the memory the various commands or strategies by which the shuttle car 10 may proceed from the feeder 112 to the continuous miner 110 and back again to the feeder 112. The "R" key is used to reset any initial or dynamic condition including commands. The "CM" key is used to clear any specific entry if a change is to be desired. The "CM" key clears, for example, that portion of the RAM 72 of the microprocessor 73 that has been dedicated to storing the various strategies or commands and positions of the continuous miner 110 and feeder 112. As a safeguard, it is necessary in addition to depressing the "CM" key, to also enter a coded word, e.g. a string of numerical characters.

After entering a piece of data, for example the initial starting point by depressing the I key and two numerical keys, that data is displayed upon an LED display 102 as "I, 0,1" in the given example. Thereafter to enter that data into RAM 72, the operator presses the ENTER key whereby that data is transmitted into the RAM 72. The "CD" and the "FD" keys program the microprocessor 73 as to the direction in which the shuttle car 10 is proceeding, i.e. if the "CD" key is pressed, the RAM 72 is taught that the shuttle car 10 is proceeding along path 118 from the feeder 112 to the continuous miner 110 and if the "FD" key is depressed, it is indicated that the shuttle car 10 is proceeding from the continuous miner 110 along path 120 to the feeder 112. The "S" key is dedicated to programming the number of shuttle cars 10 that are included with a particular control system, e.g. one or two such cars. The INTERRUPT key is used to set initial conditions including the various strategies or commands in RAM 72, the initial position of the shuttle car 10, the number of cars, the positions of the continuous miner 110 and the feeder 112. As will be apparent from the further description of the program as set out below with respect to FIGS. 6 to 11, the pressing of the INTERRUPT key causes the program to branch to an initialization point in the program whereby the operator at that point in the operation of the shuttle car 10 can ENTER the initialization conditions. When the INTERRUPT key is pressed, the program automatically saves the address of that step being currently executed and, upon pressing of the EXECUTE key, the program is caused to return to that address step in the program. The EXECUTE key is pressed after the particular instructions have been entered. The keys X+,X−, X+,Y− indicate respectively the four vector directions as shown by the arrows in FIG. 4. Such keys are depressed in cooperation with a turn command, whereby the direction in which the shuttle car 10 is to turn is entered into the RAM 72. Similarly, the initial starting point also includes an initial direction in which the shuttle car 10 is to proceed and a corresponding key X+,X−, Y+ or Y− is depressed in connection with the actuation of the "I" key. In addition, the position of the feeder 112 and the continuous miner 110 is not normally disposed at a coordinate point, but is disposed offset in one of the aforementioned directions. Thus, to program the position of the continuous miner 110, the operator presses the "C" key, 1,2 and the Y+ key to indicate that the continuous miner 110 is disposed in the location as shown in FIG. 4. The "," key is actuated to provide a break or spacing between the entry of data; for example, the entry of two coordinate positions would be effected by pressing a first numerical key, the "," key and thereafter a second numerical key.

The "V" key is dedicated to establishing the position at which a ventilation curtain 134 is disposed across one of the entries or corridors as shown in FIGS. 4 and 5C; such curtains 134 are used to provide the free-flow of gases, possibly dangerous gases, throughout the mine. As will be explained later, the vehicle guidance system 19 is programmed to sense and to ignore the presence of such curtains 134, whereby the shuttle car 10 proceeds through such a curtain 134 merely brushing it aside without damage either to the car 10 or to the curtain 134. Typically, there is more than one curtain 134 within a mine and the number of that curtain 134 is set by depressing the key "N". In order to store the position of the curtain, an operator uses the program pad 100 by pressing in sequence the following keys: (1) the INTERRUPT key, (2) the "R" key, (3) the "V" key, (4) the "N" key, (5) two numerical keys to identify the X,Y coordinates of that curtain 134, (6) one of the direction keys X+, X−, Y+ or Y−, (7) the ENTER key, (8) one of the "CD" or "FD" keys, (9) the ENTER key and, finally, (10) the EXECUTE key. In this fashion, the relative position of the curtain 134 with respect to a designated X,Y coordinate, the number of the particular curtain 134, the destination of the shuttle car 10 from the curtain 134 are entered and finally upon pressing the EXECUTE key, the routine is returned to the point at which execution of the program was interrupted.

In order to program the RAM 72 of the microprocessor 73 with a TURN command the operator in initializing the vehicle guidance control system 19 utilizes the program pad 100 in the following fashion. First, the operator depresses the INTERRUPT key causing the program to loop back to its initialization point, i.e. step 140 as will be described with respect to FIG. 6. Next, the operator presses the TURN key "T" and thereafter presses the "," key to separate the turn command from the next instruction. The operator then presses two numerical keys to indicate respectively the X and Y coordinates of the turn command before pressing the "X−" indicating the direction of the turn. Thereafter, the operator presses the ENTER key whereby the instructions are loaded into the storage location of the RAM 72 corresponding to the designated X,Y coordinate.

As will become apparent in the following description of the program with respect to FIGS. 6–11, the program of control in accordance with the vehicle guidance system 19 of this invention, includes the three folllowing main modes of operation: (1) the transit mode 200, (2) the continuous mining (CM) docking mode 300, and (3) the feeder docking mode 400. The transit mode or routine 200 is the primary mode of operation and maintains the shuttle car 10 directed along the substantial median or middle line of the corridor or entries of the coal system as shown in FIG. 4. The microprocessor 73 effects an exit from the transit mode, in response to the detection of a signal received from either the transmitter of continuous miner 110 at a first frequency, or of a signal of a second frequency from the transmitter of the feeder 112. The microprocessor 73 controls the access of the input signals from the various sensors and the timing of the output signals in timed relation with the execution of the commands stored within its RAM 72. In particular, the microprocessor 73, during the execution of its transmit mode 200, is primarily controlling the operation of the side ultrasonic transmitter/receivers 36, 38, 40 and 42 each including as shown a transmitter as identified with the letter "b" and a receiver as identified by the letter "a". As shown in FIG. 1A, the transmitter/receivers 36, 38, 40 and 42 are disposed symmetrically about the shuttle car 10 and, in particular, each transmitter/receiver is disposed above a wheel 20. The microprocessor 73 applies actuating or pulsing signals via the data bus 76, as shown in FIG. 2, an associated D/A converter 85 to regularly pulse each of the side transmitters 36b, 38b, 40b and 42b, whereby sonic signals are emitted therefrom to provide return signals from the corridor walls to be sensed by the corresponding of the receivers 36a, 38a, 40a and 42a. As shown in FIG. 5F, the transmitter 36b transmits an ultrasonic sound along a path indicated by the numeral 37b to be reflected by the corridor wall 39 back along path 37a to be detected by the receiver or sensor 36a. The distance between the side of the shuttle car 10 and the corridor wall 39 is given by the following equation:

$$d = V_s(V,T)t.$$

$V_s$ = the velocity of ultrasonic sound in air (both frequency "V" and $V_s$ = in air (both frequency "V: and temperature "T" dependent)

t = time between transmission and reception of signal

Four such distances $d_1$, $d_2$, $d_3$ and $d_4$, corresponding to the four transmitter/receivers, 36, 38, 40 and 42, as shown in FIG. 5D, are obtained in the above described manner and then fitted (in a least squares nature) so that the approximate alignment or turning commands as calculated and applied by the microprocessor 73 to the steering actuator 90 correct for any displacement of the shuttle car 10 from the median or middle line identified by the numeral 41 in FIG. 5D. In particular, the microprocessor 73 issues the steering commands to ensure that the following relationship is met:

$$\text{Min}|\vec{d}_2 - \vec{d}_1| + \text{Min}|\vec{d}_4 - \vec{d}_3|$$

The calculations of the distances $d_1$, $d_2$, $d_3$ and $d_4$, as well as the alignment calculations as indicated above are made at regular intervals of illustratively of 0.1 second.

FIG. 5G illustrates the shuttle car 10 proceeding along a main entry or corridor 106 until it enters an intersection with an intersecting subentry or corridor 108. The side transmitter/receivers 36, 38, 40 and 42 are used to determine the occurrence of the intersection by obtaining at any one time frame a set of distances $d_1$, $d_2$, $d_3$ and $d_4$ and comparing them in that time frame to determine whether any of the following conditions are met:

$$|\vec{d}_1| >> |\vec{d}_2| \text{ or } |\vec{d}_2| >> |\vec{d}_1| \text{ or}$$
$$|\vec{d}_3| >> |\vec{d}_4| \text{ or } |\vec{d}_4| >> |\vec{d}_3|$$

If the difference between any of the aforecalculated differences is great, there is an indication that a corridor intersection has been reached by the shuttle car 10. For example if the difference between the distances $d_3$ and $d_4$ becomes great, as shown in FIG. 5G, the presence of the intersecting corridor 108 is detected. On the other hand, if the corridor 108 should extend on either side of the main entry 106, that determination would be made by comparing the distances $d_3$ and $d_4$ to the rearwardly determined distances $d_1$ and $d_2$, as the shuttle car 10 proceeds in the direction indicated by the arrow in FIG. 5E. Upon determination that an intersecting corridor has occurred, the microprocessor 73 updates the current car location stored in terms of its X,Y coordinates in designated memory locations of the RAM 72. For example, as the shuttle car 10 proceeds in the Y+ direction from its position, as shown in FIG. 4, it will encounter the intersection having X,Y coordinants (0,1) and a vector direction of +Y. After making the turn along path 118, the RAM storage locations are updated to indicate that the last intersection point was (0,1) and that the shuttle car 10 is proceeding in the X+ direction. When the shuttle car 10 detects the presence of the next corridor, i.e. a main entry 106 as shown in FIG. 4, that fact is detected and the vehicle guidance control system 19 updates the current position RAM area to indicate its X,Y coordinate position to be (1,1). As illustrated in FIG. 4, a turn command is located in the (1,1) location of the RAM 72, which turn command is executed by the microprocessor 73. After the turn is made, the current car RAM area indicates that the shuttle car 10 is traveling in the Y+ direction.

If there is no strategy or command at the addressed coordinate location of the RAM 72, the microprocessor 72 interprets such absence as a "null" command and immediately accesses via the data bus 76 the gyro unit 52a. The output of the gyro control unit 52 is indicative of the orientation that the shuttle car 10 was proceeding along immediately before it crossed the intersecting corridor. The microprocessor 73 applies the vector direction output of torque gyro unit 52 to the steering actuator 92 to maintain the direction of the shuttle car 10 as it proceeds through the corridor intersection. Upon leaving the corridor intersection and upon entering the next corridor, at least one of the side ultrasonic transmitter/receivers 36, 38, 40 and 42 provides a signal indicating the close spacing of the corridor wall 39 and that the corridor has been reentered. Upon reentry, the vehicle guidance system 19 operates to realign the shuttle car 10 along the corridor median as described above with respect to FIG. 5D.

Figure 10:
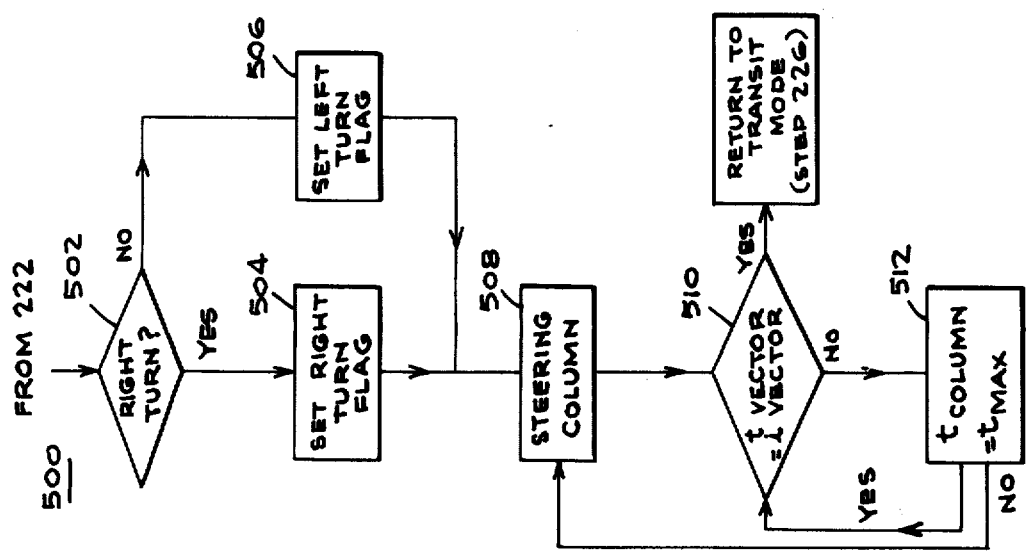
FIG. 10 shows a detailed, low-level flow diagram of the turning procedure or subroutine generally shown in FIG. 7A.

If upon entry to an intersection, the RAM 72 of the microprocessor 73 is accessed and a turn command "T" is stored in that location addressed RAM corresponding to the corridor intersection, a turn subroutine, as will be explained later with respect to FIG. 10, is entered whereby shuttle car 10 is steered by the steering actuator 92 under the control of the control signals generated by the microprocessor 73. In the turn subroutine, the real-time clock 74 generates commands to the steering actuator 92 that are coordinated with the output signals as derived from the side ultrasonic transmitter/receivers 38, 40, 42 and 44. After the turn is made, it is apparent that a change of direction has been made and the vector flag indicating that change is entered into the current position RAM area, whereby upon entering the next corridor intersection that the coordinate X or Y of the shuttle car 10 may be appropriately updated in view of the changed vector direction.

A further command or strategy that may be executed by the program as operating in the transit mode is the "wait and see" command. The "wait and see" point is that coordinate within the grid, as shown within FIG. 4, where the shuttle car 10 is brought to a halt so that it may communicate with the other shuttle car 10. By disposing the "wait and see" point remote from either the feeder 112 or the continuous miner 110, shuttle car congestion and collision are avoided. In a non-common haulage system where two shuttle cars 10 proceed between the feeder 112 and the continuous miner 110 along different paths, i.e. paths 118 and 120 as illustrated in FIG. 4, there is not the need to take evasive maneuvers whereby one shuttle car 10 avoids the other shuttle car 10. In the non-common haulage situation, the "wait and see" point is a coordinate location where a shuttle car 10 stations itself to communicate with its shuttle car counterpart. At this point in time, the first or master shuttle car 10 transmits from its CM transmitter 54b a data request signal. When the second or slave shuttle car 10 arrives at its "wait and see" point and receives via its CM receiver 54a the transmitted signal, the slave shuttle car 10 in turn transmits a data transmit signal that is received and interpreted by the master shuttle car 10 to begin to transmit data indicative of the new position of the continuous miner 110, as described above. After all data has been transmitted, an end of transmission signal is transmitted by the master shuttle car 10 at which time each of the master and slave shuttle cars 10 continues along its path to its destination.

In the common haulage situation, both shuttle cars 10 proceed along a common path between the continuous miner 110 and the feeder 112 and it is necessary for one of the shuttle cars 10 to take an evasive maneuver to permit the other shuttle car 10 to pass, at which time the first shuttle car 10 resumes its trip to its destination. In this instance, the "wait and see" point is that coordinate point of the corridor intersection at which time a "wait and see" command is programmed into the corresponding RAM location. The shuttle car 10 first arriving at the "wait and see" point is commanded to turn into the side entry and wait for the passage of the second shuttle car 10. As the second shuttle car 10 reaches the "wait and see" point, it is brought to a halt and initiates transmission to the first shuttle car 10 in a manner as described above. After transmission, the second shuttle car 10 proceeds to its location and the first shuttle car 10 that has taken an evasive maneuver, returns to the corridor along which it was traversing and then proceeds to its destination.

As shown in FIG. 5C, check curtains 134 are disposed in selected of the corridors to stop or deflect air currents, thus reducing the dangers of poisonous gas that may seep throughout the mine system. Check curtains 134 are normally constructed with a slit down their middles that permit shuttle cars 10 to readily pass therethrough. As explained above, the relative position with respect to one of the coordinates as seen in FIG. 4 of such a check curtain 134 is stored at the corresponding RAM location and, upon approaching a check curtain 134, the vehicle guidance control system 19 is alerted thereto. Generally, the location of the check curtain 134 is preprogrammed into the RAM 72 after the check curtain 134 has been installed. As the shuttle car 10 approaches the check curtain 134, the vehicle guidance control system 19 is alerted to the presence of the check curtain 134 to deactivate the FORWARD and AFT ultrasonic transmitter/receivers 28 and 30, whereby their detection of reflected signals indicating a check curtain 134 will be ignored and the shuttle car 10 will be permitted to proceed on through the check curtain 134. As seen in FIG. 5C, the forward ultrasonic transmitter/receivers 28 and 30 each transmit ultrasonic waves to be reflected by the check curtain 134 and to be subsequently detected by their receivers. If nearly identical symmetrical responses are output by both receivers, there is an indication of the presence of the check curtain 134. The microprocessor 73 compares the outputs of these fore receivers to determine whether the waveforms of the receiver outputs are symmetrical, as shown in FIG. 5D. Symmetrical waveforms occur when a curtain or other similar planar type surface scatters the transmitted sound waves in a symmetrically even fashion. Thus, when symmetric response is received and the microprocessor 73 knows that a check curtain 134 is in the vicinity, the vehicle guidance system 19 deactivates the obstacle detection tests, whereby the shuttle car 10 may proceed through the check curtain 134. On the other hand, if the receiver output waveforms are non-symmetrical as shown in FIG. 5E, or a symmetrical response is received in a location in which a check curtain 134 has not been programmed, there is an indication that an obstacle other than a ventilation curtain, i.e. a human operator, is present and the shuttle car 10 is commanded to stop and remain so until manual intervention is performed.

In the continuous mining docking mode, the shuttle car 10 is guided to a coal transfer relationship with the continuous miner 110, as shown in FIG. 5B. The continuous miner 110 includes a driven conveyor 130 whereby coal may be removed from the face of the mine and conveyed to its boom 128 that is capable of being raised over the shuttle car 10, whereby the coal is transported onto the conveyor 22 of the shuttle car 10. In order to distribute the coal evenly along the length of the shuttle car conveyor 22, the conveyor 22 is driven by the conveyor motor 24 as the coal is deposited from the continuous miner boom 128. Essentially, docking is accomplished by positioning the boom 128 of the continuous miner 110 over the conveyor 22 of the shuttle car 10. After docking has been achieved, the coal is transported by the conveyor 130 along the length of the continuous miner 110 and then over its boom 128, before being dropped onto the conveyor 22 of the shuttle car 10. Once the shuttle car 10 is completly loaded, the shuttle car 10 backs away from the continuous miner 110 and proceeds with the coal back to the feeder 112.

As discussed above, the RAM 72 of the microprocessor 73 is initially programmed with the vector direction of the continuous miner 110 with respect to the closest coordinate location of the coal mine system as shown in FIG. 4. The vehicle guidance control system 19 enters its continuous mining docking mode as the shuttle car 10 approaches the continuous miner 110 and receives a signal of a defined first frequency as transmitted from a transmitter of the continuous miner 110. The continuous miner also includes a computer that serves to calculate the angle of orientation of its boom 128 with respect to the corridor median, and to transmit same to the continuous miner receiver 54a of the shuttle car 10, whereby the microprocessor 73 can calculate a path trajectory whereby the shuttle car 10 is guided to a point where the continuous miner boom 128 intercepts the conveyor 22 of the shuttle car 10. After entry into the continuous docking mode, the CM transmitter 54b sends a transit signal which is detected by the receiver of the continuous miner 110, whereby data in the form of the boom orientation is transmitted and received by the CM receiver 54a. With this data stored in RAM 72, the microprocessor 73 calculates a path trajectory and thereafter applies signals to the steering actuator 92 to steer the shuttle car 10 to its docking point.

After the shuttle car 10 has come to its docking point, the microprocessor 73 actuates the vertically positioned ultrasonic transmitter/receivers 44 and 46 that are disposed on either side of the conveyor 22, as shown in FIG. 1A. The transmitter/receivers 44 and 46 transmit vertically oriented, ultrasonic signals that detect whether the continuous miner boom 128 has been disposed therebetween. Once such signals have been received from the transmitter/receivers 44 and 46, a light indicator (not shown) on the continuous miner program pad is energized and, then, the vehicle guidance system 19 activates the conveyor 22 thus driving it to ensure an even distribution of coal along its length. As shown in FIG. 1A, the conveyor 22 is driven by the conveyor motor 24, whose output is connected to a conveyor displacement sensor 64, which detects the current drawn by the conveyor motor 24. The coal or load "L" is a characteristic of the conveyor motor load in terms of motor current "L(i)". The microprocessor 73 requires that the coal load be evenly distributed over a length of the conveyor 22 in accordance with the following expression:

$$\frac{DW}{DY} = \frac{DF(L)}{DY}$$

-continued $$DW = \frac{DF(L)}{DY} DY$$

or in finite terms $$W \simeq \frac{DF(L)}{DY} \Delta Y$$

It is well recognized that the load placed upon the conveyor motor 24 is a function of the motor current L(i) whereby the coal weight may be expressed as follows:

$$W \simeq \frac{DF(L,i)}{DY} \Delta Y$$

Thus, when a given amount of current has been measured by the conveyor displacement sensor 64, the microprocessor 73 issues a command to deenergize the conveyor motor 24, bringing the conveyor 22 to a halt with a load of coal evenly distributed along its length. In addition, the microprocessor 73 activates the CM transmitter 54b to transmit a signal to the receiver of the continuous miner 110 to discontinue the loading of coal, i.e. to halt its conveyor 130. At this time, the on-board computer of the continuous miner 110 actuates its transmitter to send data indicative of its current position to the CM receiver 54a of the docking shuttle car 10, whereby the updated continuous miner location is stored within the RAM 72 of the microprocessor 73. The updated continuous miner location is stored therein until it is transmitted to the other shuttle car 10 at its "wait and see" point as described above.

Before returning to the feeder 112, the microprocessor 73 applies a reset signal via the D/A convertor 90 to the gyro control unit 52, whereby its reference vector direction is reset to an established vector direction of the corridor leading to the continuous miner 110. Thus if the reference vector direction as stored in the gyro control unit 52 may have varied, it is retorqued to a known vector direction at each or every other visit to the continuous miner 110.

The above-described continuous mining docking mode is described as an automatic mode requiring the on-board microprocessor 73 of the shuttle car 10, as well as a further computer associated with the continuous miner 110 to interchange data in order to "dock" the shuttle car 10. In another mode of operation, it is contemplated that an operator could manually operate a joy stick associated with the continuous miner 110, whereby signals would be transmitted from the continuous miner and received by the CM receiver 54a to control the car movement, i.e. steering and direction of the shuttle car 10, as it moves to the docking point. In addition, the continuous miner operator would also have control of the shuttle car's conveyor 22 and a signal as derived from the conveyor displacement sensor 64 would be transmitted by the CM transmitter 54b to provide an indication to the continuous miner operator that the shuttle car conveyor 22 has been evenly and fully loaded.

After the shuttle car 10 has been loaded by the continuous miner 110, it traverses the path 120, as shown in FIG. 4, from the continuous miner 110 to the feeder 112, more fully shown in FIG. 5A. The feeder 112 includes a control circuit or microprocessor 123 that activates a transmitter to send a signal at the second or feeder frequency to be detected by the feeder receiver 56a of the shuttle car 10. As the shuttle car 10 approaches the feeder 112, its feeder receiver 56a detects the feeder frequency signal to dispose the vehicle guidance system 19 and, in particular, to its microprocessor 73 into its feeder docking mode 400. Initially, the feeder docking mode causes a command to be issued to the boom actuator 63, as shown in FIG. 2, whereby the boom 23 is raised to an angle $\theta$ MAX as shown in FIG. 5A. It is necessary to raise the boom 23 to this angle so that the boom 23 may be disposed over the feeder and, in particular its crusher 122. At a distance d- check-from the feeder 112, the microprocessor 73 checks to determine whether the boom 23 has been raised to its full extent, i.e. to the angle $\theta$ MAX. In particular, the microprocessor 73 accesses the signal derived from the boom angle sensor 62 and if that signal indicates that the boom angle $\theta$ MAX has been reached, the shuttle car 10 proceeds toward the feeder 112 until it reaches a rendezvous distance "dr". At the rendezvous distance "dr", the boom 23 of the shuttle car 10 is disposed immediately over the crusher 122 so that coal may now be conveyed by the shuttle car conveyor 22 and dropped into the crusher 122. The rendezvous distance "dr" is measured by the aft ultrasonic transmitter/receivers 32 and 34 that transmit signals that are reflected by the feeder 112 to be detected by the aforenoted receivers, the time of transmission being measured by the microprocessor 73 to determine the distance between the shuttle car 10 and the feeder 112. When the rendezvous distance "dr" is reached, the microprocessor 73 stops the shuttle car motor 25 and initiates actuation of the conveyor motor 24, whereby the conveyor 22 unloads the coal into the crusher 122. After loading is completed, the microprocessor 73 accesses its RAM 72 to transmit data via the feeder transmitter 56b indicative of the particles and gas as sensed by its methane/particle detector 66 during transit from the continuous miner 110 and data indicative of the coal unloaded by the shuttle car 10, to the microprocessor 123 of the feeder 112. After transmission is completed, the shuttle car 10 pulls away from the feeder 112 and its boom 23 is lowered. At this time, the continuous miner "look" flag is set into RAM 72 as an initial condition and the microprocessor 73 returns to its transit mode 200.

Figure 6:
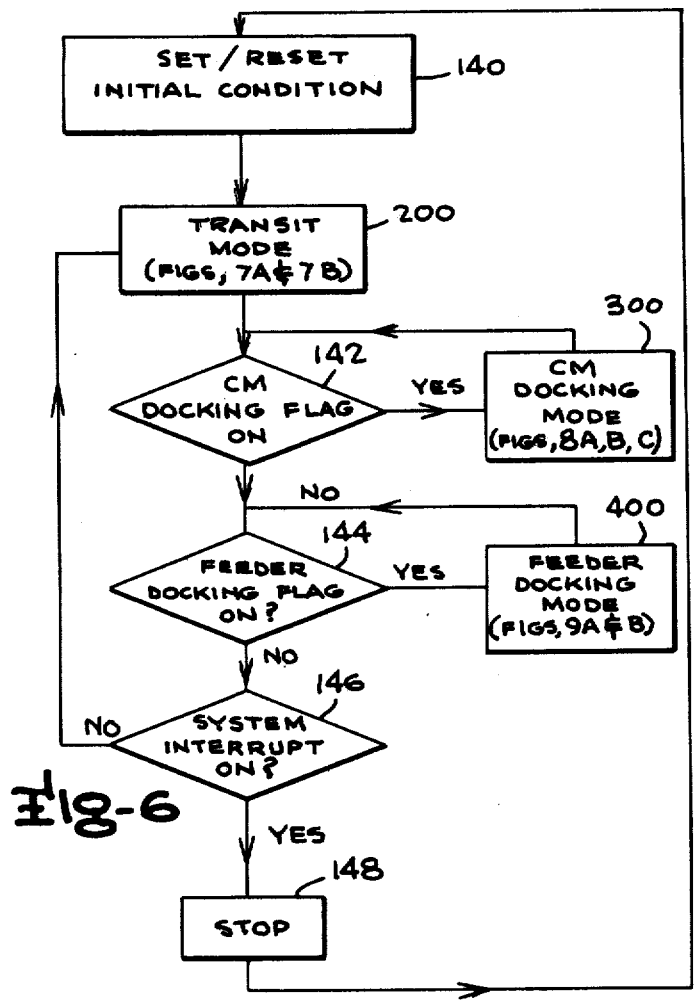
FIG. 6 shows a high-level flow diagram of the program stored within the computer memory of the vehicle guidance control system shown in FIG. 2.

Referring now to FIG. 6, there is shown a high-level flow diagram showing the three primary modes or routines in which the vehicle guidance system 19 may be programmed, i.e. its transit mode 200, the continuous mining (mc) docking mode 300 and the feeder docking mode 400. FIGS. 7-11 show the particular steps of these modes in greater detail. Initially, the initial conditions are set (or reset) in step 140. For example, the initial position of the shuttle car 10, the initial vector direction of the car 10, the positions of the continuous miner 110 and the feeder 112, the various strategies or commands including "wait and see", null and turns, and one of a CM docking flag or feeder docking flag are set in dedicated the addressed storage locations of the RAM 72. The initial vector direction is used by the set torque gyro 52b to control the direction of the shuttle car 10 along one of the entries. The continuous miner or feeder flag is used to tell the microprocessor 73 whether the shuttle car 10 is approaching the continuous miner 110 or the feeder 112, respectively. Thereafter, the program enters its transit mode 200 that controls the movement of the shuttle car 10 from the feeder 112 to the continuous miner 110 along path 118, and from the continuous miner 110 to the feeder 112 along path 120.

Upon sensing the transmission of the first or continuous miner (CM) frequency signal, the program sets a CM docking flag and exits the transmit mode to determine in step 142 whether the continuous miner docking flag is set and, if so, enters the continuous docking mode 300. If not, the program senses the transmission of the feeder frequency signal to set its feeder docking flag; if the feeder docking flag is so set by decision step 144, the program moves to the feeder docking mode 400. If the INTERRUPT button on the shuttle car operator's panel or the interrupt bar 50 is pressed, this is detected in step 146 and, if yes, the program moves to step 148, whereby the shuttle car 10 is brought to a halt until the operator manually resets the vehicle guidance control system 19 and the program returns to the set initial conditions step 140. If the interrupt bar 50 has not been depressed as by an obstacle or a coal miner, the system returns to the transit mode 200.

Figure 7A:
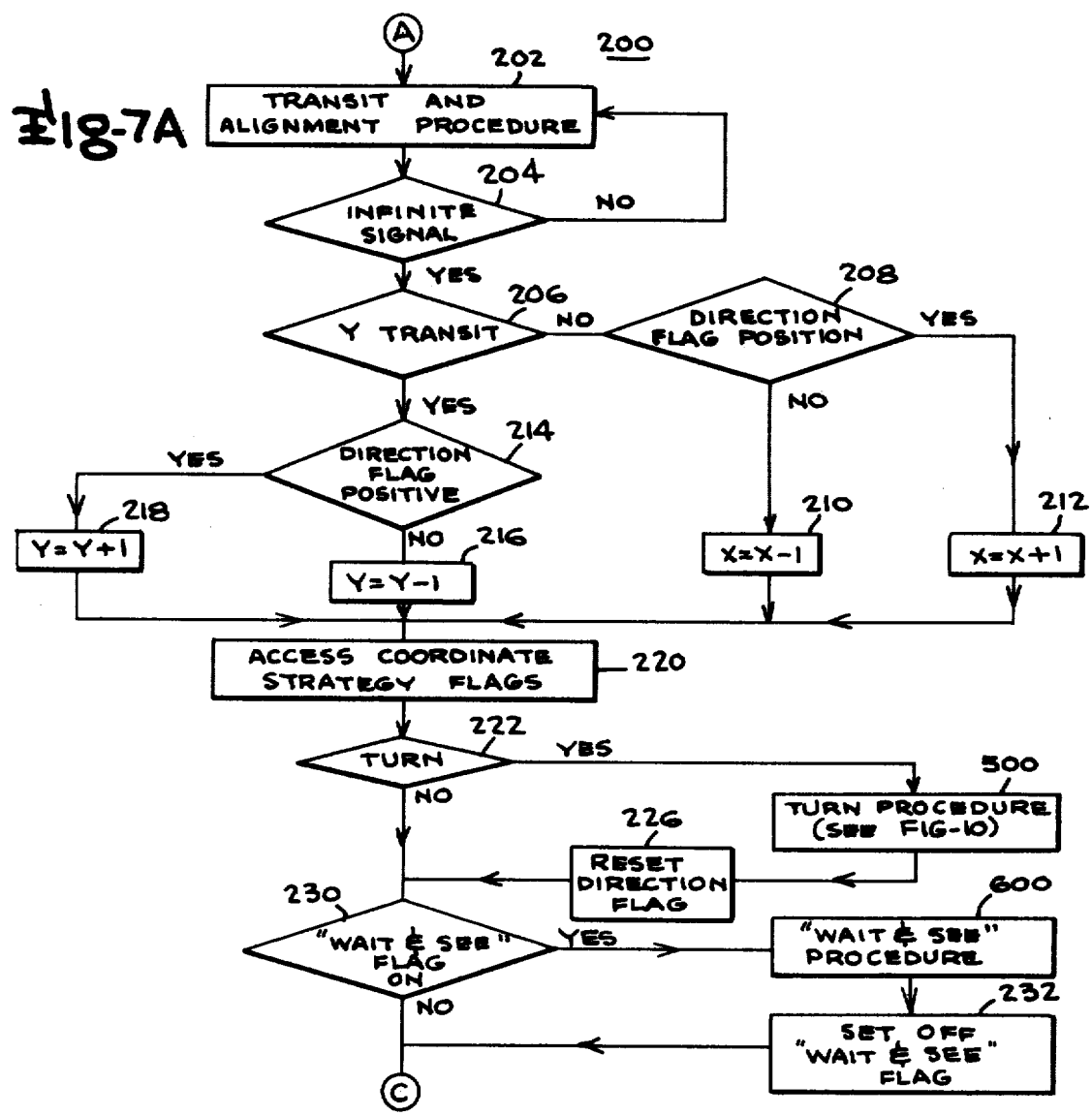
FIGS. 7A and B show a more detailed, lower level flow diagram of the transit mode or routine generally shown in FIG. 6.

The transit mode 200 is more fully shown in the lower-level flow diagrams of FIGS. 7A and B. Initially, the transit mode 200 proceeds to step 202 that effects alignment of the shuttle car 10 along the corridor median. As explained above in greater detail, the microprocessor 73 causes ultrasonic signals to be transmitted from the transmitters 36b, 38b, 40b and 42b to be reflected from the corridor walls 39 and detected by the receivers 36a, 38a, 40a and 42a, respectively. The time of transmission is a function of the distance of each transmitter/receiver to its corridor wall, and the calculated distances are compared with each other to provide control signals to the steering actuator 92 to maintain the shuttle car 10 being guided along the corridor median. Periodically, e.g. at a 20 msec. cycle time, step 204 compares the measured distances as calculated from the outputs of, the receivers 36a, 38a, 40a and 42a and if there is an order of magnitude difference between selected of these signals, i.e. an infinite signal, there is an indication that a corridor intersection has been reached; if not, the routine returns to step 202. Upon reaching a corridor intersection, the current position RAM area indicative of the current X,Y coordinate position of the shuttle car 10 within the matrix of coordinates as shown in FIG. 4, is updated. To this end, step 206 determines whether the vector direction of the shuttle car 10 is a Y-vector and, if so, step 214 determines whether that flag is positive or negative. If the vector direction is Y-positive, step 218 increments positively the Y-RAM location and, if negative, step 216 decrements the Y-RAM location. If on the other hand, a X-vector direction is set, step 208 determines whether the X-vector direction is positive or negative. If negative, step 210 decrements the X-RAM location and, if positive, step 212 increments the X-RAM location. The transit mode continues to step 220 generally indicating that upon detection that a corridor intersection has been entered, the RAM 72 is accessed to determine the command or strategy corresponding to the updated X,Y coordinate position as stored in the X and Y locations of the current position RAM area. Step 222 determines whether any turn strategy or command "T" is stored in that location and, if so, the program enters a turn procedure or subroutine 500, as more fully described below with respect to FIG. 10, wherein a turn procedure or subroutine is executed by the microprocessor 73. After the turn is completed, step 226 resets the direction vector; for example, if the shuttle car 10 was proceeding along an X+ direction as shown in FIG. 4, and a left-turn is made it is necessary to change the vector direction to an X-negative flag.

Figure 7B:
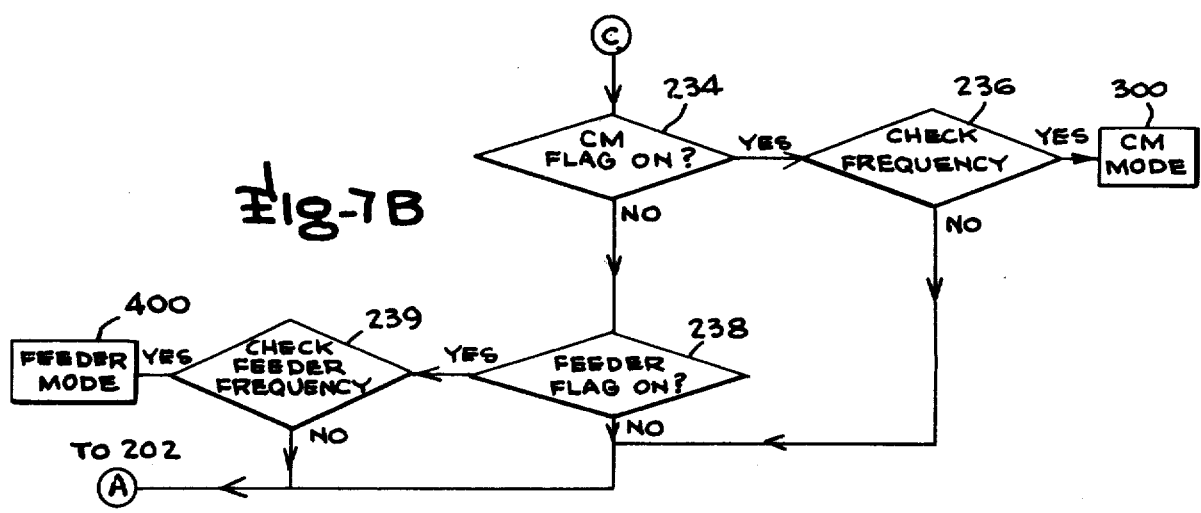

If NO-turn strategy is stored, the program determines by step 230 whether a "wait and see" strategy is set and, if yes, the program moves to the "wait and see" subroutine 600. After the "wait and see" subroutine is executed, step 232 sets off the "wait and see" flag before step 234, as seen in FIG. 7B, looks to see if the continuous miner flag has been set indicating that the shuttle car 10 is traversing toward the continuous miner and if yes, step 236 actuates the CM receiver 54a to determine whether a signal of the first or continuous miner frequency is transmitted from the continuous miner 110; if yes, the program exits to the continuous miner (CM) docking mode 300; if no indicating that the CM frequency signal is detected, the program returns to step 202 of the transit mode. Similarly, step 238, determines whether the feeder flag has set, indicating that the shuttle car 10 is transitioning toward the feeder 112 and, if yes, step 239 actuates the feeder receiver 56a to determine whether the second or feeder frequency signal is being detected as transmited from the feeder 112; if yes, the program sets its feeder docking flag and exits to the feeder mode 400. If either the feeder flag is not set or the feeder frequency cannot be detected, the program returns to step 202 of the transit mode.

Figure 8C:
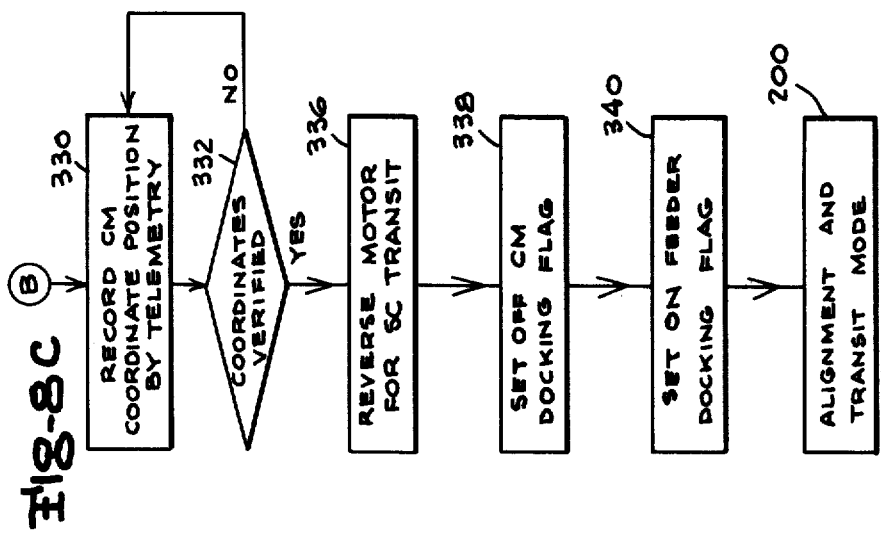
FIGS. 8A, B and C show more detailed, lower-level flow diagrams of the continuous miner docking mode or subroutine generally shown in FIG. 6.
Figure 8B:
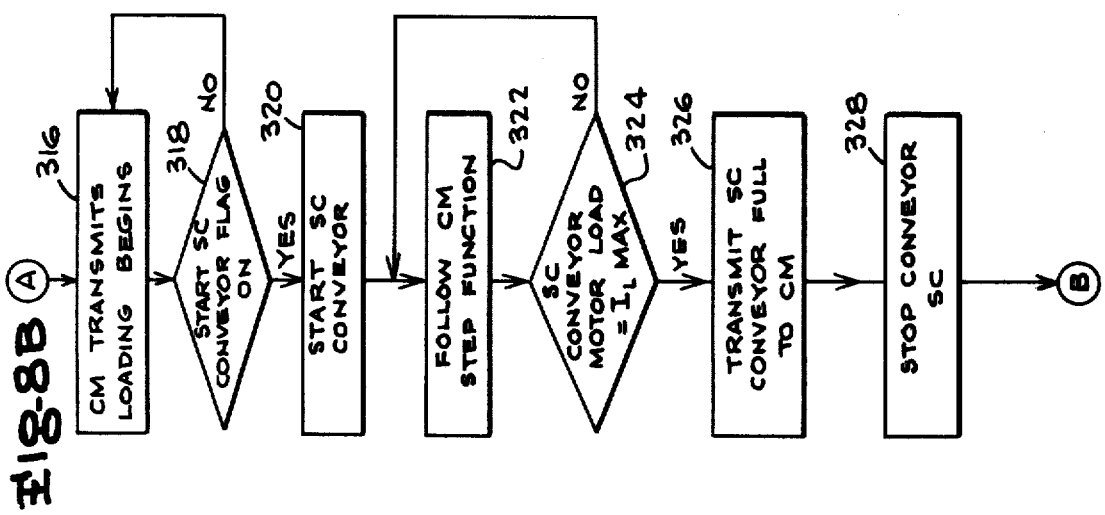
Figure 8A:
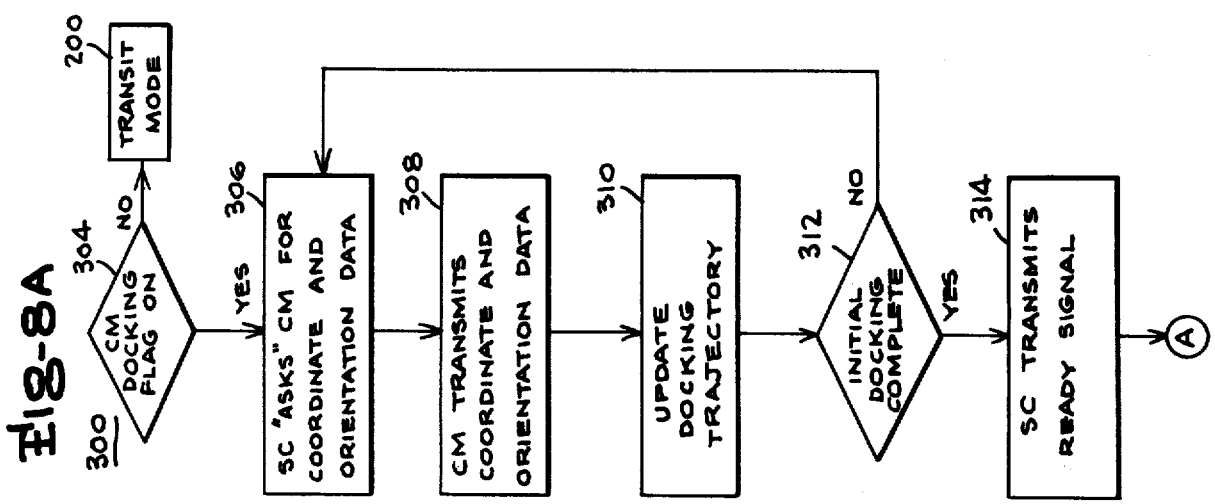

If a signal of the first or continuous miner frequency is detected in step 236, the program sets its CM docking flag and exits to its CM mode 300, as more fully shown in the lower-level flow diagram of FIGS. 8A, B and C. As shown in FIG. 8A, step 304 determines whether the CM docking flag has been set, indicating that the shuttle car 10 is set to transmit data to the continuous miner 110 and, if not set, the program returns to the transit mode 200. If the CM docking flag is set, step 306 actuates the CM transmitter 54b to send a signal requesting the present X,Y coordinate position of the continuous miner 110 and its alignment in terms of angular displacement from its X,Y coordinate position. Thereafter, in step 308, the CM receiver 54a is actuated to receive the coordinate orientation data transmitted from the continuous miner 110. Next in step 310, the trajectory path is calculated based upon the position of the continuous miner 110 from its coordinate position. Next, step 312 accesses periodically the outputs of the vertically positioned ultrasonic transmitter/receivers 44 and 46 to determine whether the continuous miner boom 128 is disposed between the transmitter/receivers, i.e. the boom 128 is over the conveyor 22 of the shuttle car 10. If the boom 128 is not correctly positioned, the routine returns to step 306 and new data is obtained and a new trajectory is calculated. If the boom 128 is correctly positioned, the routine moves to step 314 which actuates the CM transmitter 54b to send a READY signal to the continuous miner 110. As seen in FIG. 8B, step 316 actuates the CM receiver 54a to receive and store in RAM 72 the updated position of the continuous miner 110. Next, step 316 actuates the CM receiver 54a to receive a signal from the continuous miner 110 indicating that it has actuated its conveyor 130 to load coal onto the conveyor 22 of the shuttle car 10 and to set the start shuttle car conveyor flag. Step 318 determines whether the start shuttle car conveyor flag has been set and, if not, returns to step 316. If yes, step 320 energizes the conveyor motor 24 thereby initiating the loading of coal onto the shuttle car conveyor 22 and determines the initial distance of the continuous miner 110 from the shuttle car 10. Next in step 322, the forward (or aft) transmitter/receivers 28 and 30 are actuated to continuously determine the distance between the shuttle car 10 and the continuous miner 110 and appropriate signals are sent to the steering actuator 92 and the shuttle car motor 25 to direct the shuttle car 10 to follow the movement of the continuous miner 110, whereby the distance between the continuous miner 110 and shuttle car 10 is kept continuously constant. Step 324 periodically monitors the output of the coneyor displacement sensor 64 and, in particular, its current to determine whether a maximum current has been accumulated, indicating that the conveyor 22 of the shuttle car 10 has been fully loaded. If not, the routine cycles back to step 322. If the maximum $I_1$ has been sensed, the routine moves to step 326, wherein the CM transmitter 5b is activated to send a signal indicating that the shuttle car conveyor 22 is full. Step 328 applies a signal to the conveyor motor 24, deactuating the motor 24 and causing the shuttle car conveyor 22 to halt. In step 330, the CM transmitter 56b is actuated to send aa request position signal to the continuous miner 110, which in turn transmits its present X,Y coordinate position to be received by the CM receiver 54a and subsequently stored in a known location within RAM 72. The received continuous miner position is checked against a known range of positions and, if not within that range as verified by step 332, step 330 again requests the position of the continuous miner 110. After the continuous miner position has been verified, step 336 actuates the shuttle car motor 25 in a reverse manner, whereby the shuttle car 10 backs away from the continuous miner 110 and in step 338, the CM docking flag is removed. In step 340, the feeder docking flag is set before returning to the transmit mode 200.

If step 239 as shown in FIG. 7B determines that the feeder frequency is received by the feeder receiver 56a, the program moves to the feeder docking mode 400 as more fully shown in the lower-level flow diagram of FIGS. 9A and B. Initially in step 402, the aft ultrasonic transmitter/receivers 32 and 34 are actuated to transmit and receive respectively ultrasonic signals to determine the distance of the shuttle car 10 from the feeder 112 and whether the waveforms of the output of the receivers 32b and 34b are symmetric. If the waveforms are non-symmetric, it is known that the feeder 112 is present. Next in step 404, the distance "df" to the feeder 112 is checked to determine whether it is equal to the boom check distance "-d-check", as seen in FIG. 5A, and, if not, the routine returns to step 402. If the shuttle car 10 has reached the check distance "-d-check", step 406 accesses the output of the boom angle sensor 62 to obtain an indication of the boom angle and, if not equal to a $\theta$ MAX, step 408 deactuates the shuttle car motor 25 bringing it to a halt, and thereafter step 410 applies an actuating signal to the boom actuator 63 to raise the shuttle car boom 23. After the boom 23 has been raised to its maximum position, step 412 determines whether the start-flag has been set indicating that the shuttle car 10 is moving; if not, step 414 sets the start-flag. After the start-flag has been verified, the routine moves to step 416 which continues to direct the shuttle car 10 until step 418 determines the rendezous distance "dr" has been reached. Step 418 periodically actuates the aft transmitter/receivers 32 and 34 until the shuttle car 10 has reached the rendezvous distance "dr". At that time, step 420 actuates the conveyor motor 24 causing the coal to be unloaded into the feeder crusher 122. Next, step 422 accesses the output of the conveyor displacement sensor 64 and compares the output with a current level Imin indicative of an empty conveyor 22. If the conveyor 22 is not yet empty, the process cycles to step 422 until there is an indication that the conveyor 22 is empty at which time the routine moves to step 426. In step 426, the feeder transmitter 56b is activated to transmit data to the feeder 112 indicating various monitor data including the data stored in RAM 72 as derived from the methane/particle detector 66 indicating the various gases contained within the mine. Thereafter, step 428 reverses the direction of the shuttle car 10 energizing the shuttle car motor 25 in a reverse direction, before entering step 430 to align the shuttle car 10 along a corridor median. Thereafter, step 432 actuates the boom actuator 63 to lower the boom 23 until it reaches its lowered or minimum position as detected in step 434. Step 434 detects whether the output of the boom angle sensor 62 equals $\theta$ MIN and, if not, recycles to step 430. After the boom 23 has been lowered, step 436 removes the feeder frequency check flag, i.e. the microprocessor 73 ceases to regularly access the feeder receiver 56a. Next in step 440, the CM frequency flag is set, whereby the microprocessor 73 regularly accesses the output of the continuous miner receiver 54a to determine whether the first or continuous miner frequency signal is being detected, before returning to the transit mode 200.

The turn procedure or subroutine 500 generally shown in FIG. 7A is shown in greater detail in FIG. 10. Upon entering the turn subroutine 500, step 502 determines whether a right turn strategy command is stored at the addressed coordinate location within the RAM 72. When in step 220, the command was accessed in RAM 72, a set of instructions or manifestations in the following form was called: $S(X,Y)=(T,X+, 90°)$. Referring to FIG. 4, assuming that $X,Y=0,1$ and the shuttle car 10 is moving in a $Y+$ direction as shown in FIG. 4, then a right turn of 90° is programmed, where the T indicates that the command strategy is a turn, the $X'+$ indicates that the vector direction after the turn is made will be in the $+X$ direction and that a turn of 90° will be made. In the example given, step 502 determines that a right turn has been programmed and, thereafter, step 504 sets a right turn flag thus calculating the "i" vector of the shuttle car 10 in the direction vector after the turn has been complete and obtains indications of the present vector direction "t" of the shuttle car 10 by accessing the electronic torque gyro unit 52a, as well as of the present angular position of the turning column associated with the steering actuator 92. As shown in FIG. 2, there is provided a turning column indicator 92a that continuously measures the present angular position of the turning column associated with the steering actuator 92. If step 502 examines the turn command and finds that a right turn has not been made, a similar set of data indicating that a left turn is to be made is read from RAM 72 in step 506. Thereafter, step 508 applies a signal via the D/A converter 86 to actuate the steering actuator 92 in the desired direction; thereafter the turning routine proceeds to step 510 which compares the present vector direction "t" to the previously calculated "i" vector. If step 510 decides yes that a match has been achieved indicating that the steering actuator 92 has been actuated for a sufficient length of time to complete the programmed turn, the turn subroutine 500 returns to step 226 of the transit mode as shown in FIG. 7A. If the turn has not been completed, a further check is made by step 512 to determine whether the present column position "t" is equal to the maximum and, if yes, the routine returns to step 510 to wait for the turn to be completed. In this manner, the vehicle guidance control system 19 may not continue to actuate the steering actuator 92 beyond that maximum turning column position and to otherwise impart damage to the steering actuator 92. If the steering column is not at its maximum position, the routine returns to step 508 whereby a further actuating signal is applied to the steering actuator 92 to effect a further incremental turning of the turning column and its associated vehicle wheels 20. As can be seen in FIG. 10, the turn subroutine cycles between steps 508 and 510, until the turn is complete at which time a return is made to the transit mode 200. The above set of instructions commands a turn of 90° as the shuttle car 10 would make from one corridor to a traversing corridor as shown in FIG. 4. In an actual coal mine, it is understood that intersecting corridors may not be necessarily at right angles with each other, and it is contemplated that turns of other than 90°, i.e. accute or obtuse angles, may be programmed. It is readily understood by one skilled in the art that the turn subroutine 500 described above would be capable of being executed to control the shuttle car through a turn of greater or less than 90°.

Figure 11:
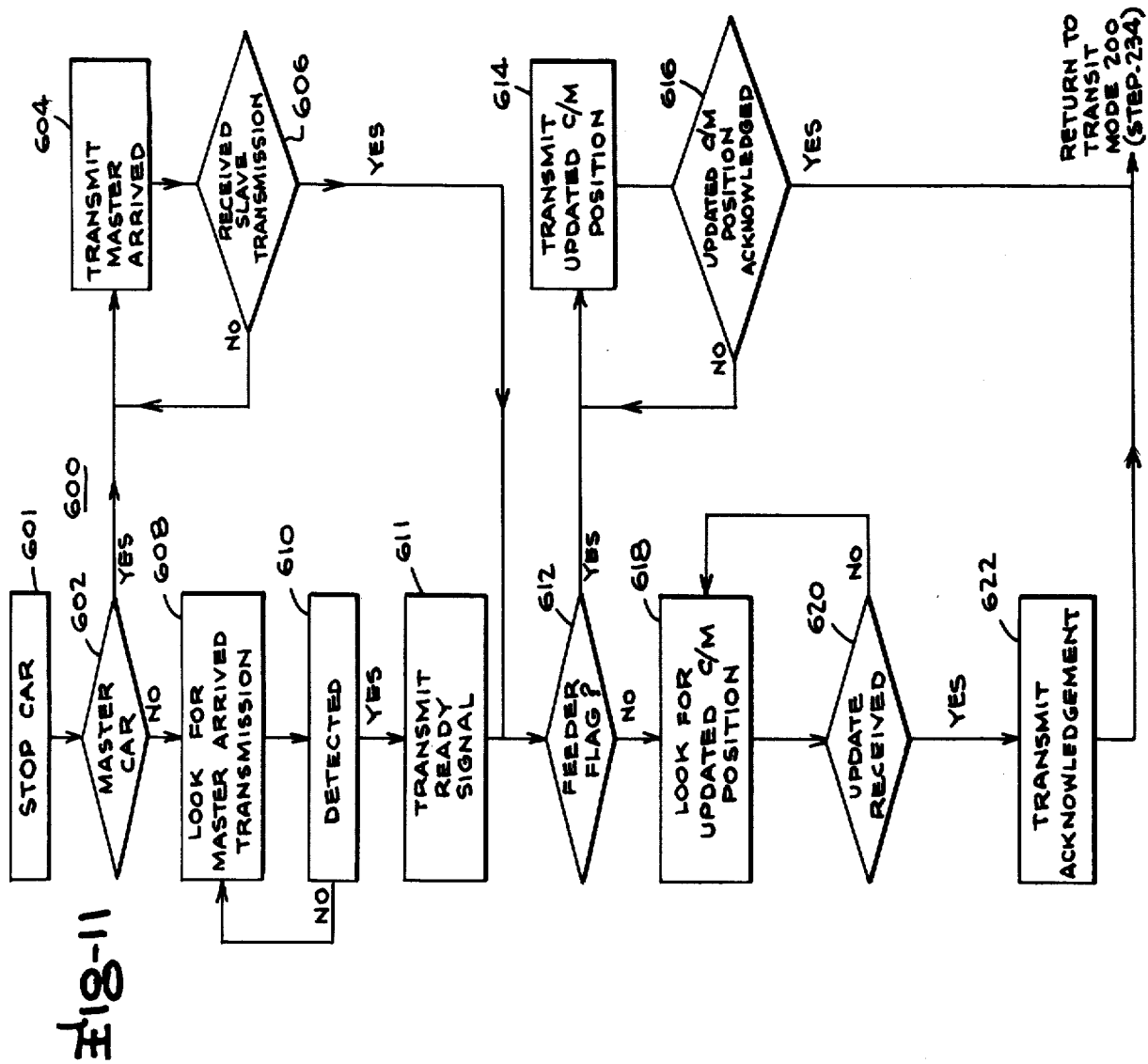
FIG. 11 shows a detailed, low-level flow diagram of a "wait and see" procedure or subroutine generally shown in FIG. 7A.

The "wait and see" procedure or subroutine 600 as generally shown in FIG. 7A is more fully shown in the lower-level flow diagram of FIG. 11. Upon entering the "wait and see" subroutine 600, step 601 removes energization from the shuttle car motor 25 thus bringing the shuttle car 10 to a halt at its "wait and see" point. Next, step 602 looks at RAM 72 to determine whether the master car or slave car flag has been set indicating that this shuttle car 10 is either a master or slave car. If the present shuttle car 10 has been designated a master car, step 604 actuates the CM transmitter 54b to transmit an arrive signal. Next in step 606, the CM receiver 54a is actuated to detect a response from the CM transmitter 54b of the slave shuttle car 10 indicating that it has arrived at its "wait and see" point. If no slave transmission is received, step 606 cycles back to step 604, the cycling occurring approximately every 5 msec until a transmission is received from the slave shuttle car 10. Upon receipt of the slave shuttle car transmission, the subroutine 600 moves to step 612. Returning now to step 602, if the shuttle car 10 is set to be a slave, the "wait and see" routine moves to step 608, wherein the CM receiver 54a is actuated to listen for a signal from the master shuttle car 10 indicating that it has arrived at its "wait and see" point. In step 610, the subroutine determines whether the master shuttle car arrive signal has been received and detected and, if not, the subroutine 600 loops back to step 608, the cycle time between steps 608 and 610 being in the order of 5 msec until the master shuttle car's arrive signal is detected. After detection, step 611 transmits a ready signal to the master shuttle car 10 indicating that the slave shuttle car 10 is now positioned at its "wait and see" point and is ready to be updated with the current X,Y coordinate position of the continuous miner 110. To that end, step 612 examines the known location within RAM 72 to determine whether the feeder flag is set, indicating that the particular shuttle car 10 is heading from the continuous miner 110 along path 120 toward the feeder 112 and therefore has received from the continuous miner 110 and stored within its RAM 72 an indication of the current location of the continuous miner 110. In that case, step 614 actuates the CM transmitter 54b to transmit a signal indicative of the stored current continuous miner position. After transmission, step 616 actuates the CM receiver 54a to wait for an acknowledgement from the other shuttle car 10 that the updated continuous miner position has been received. After the signal has been acknowledged, the subroutine returns to the transit mode 200 by entering into step 234 as shown in FIG. 7B.

If on the other hand, step 612 indicates that the feeder flag is not set and, thereby, that the shuttle car 10 is proceeding toward the continuous miner 110 along path 118 as shown in FIG. 4, the subroutine 600 moves to step 618 to actuate the CM receiver 54a to look for the signal transmitted from the other shuttle car 10 with a manifestation of the updated continuous miner position. Step 620 thereafter senses whether that data has been received and stored within RAM 72 and, if not, cycles back every 5 msec. to step 618 to again look for the CM position data. After the CM position data has been received, step 622 actuates the CM transmitter 54b to transmit an acknowledgement signal to the other shuttle car 10, before effecting a return to the transit mode 200 and, in particular to step 234.

Thus, there is been described a vehicle guidance control system that permits a vehicle to be guided along a selected path from a starting point at which illustratively there is disposed a feeder, to a destination point at which there is illustratively disposed a continuous miner and then back again to its starting point. It is contemplated in accordance with the teachings of this invention that the path to and from the destination point may be varied in a selective way and that the commands for guiding the vehicle may be stored in a memory configured as a matrix in accordance with coordinate points, selected of which define the paths between the starting and destination points. Illustratively, the points may be configured as an X,Y grid. The commands may take the form of a turn. a stop, or a proceed or null command. In that illustrative embodiment where the vehicle is adapted for a mine system, the selected path is disposed along first and second sets of corridors arranged to intersect each other, the points of intersection corresponding to the X,Y coordinate points at which commands are stored in the memory. Sensors are disposed on the vehicle to maintain the vehicle along the median of each corridor and also to sense the presence of an intersecting corridor. At an intersecting corridor, the present position of the vehicle is updated and its memory matrix accessed to determine the command to be executed at that point. In addition, it is contemplated that vehicle guidance while crossing an intersection would be achieved by the use of a gyro unit that maintains the guidance of the vehicle according to that last measured vector while still in a corridor. Further, it is contemplated that when used in a system wherein there is included a continuous miner whose command position is changing, that provision is made to update the continuous miner position by transmitting signals indicative thereof to be received by the vehicle. Such a shuttle car and more specifically a vehicle guidance system increases the productivity of the mine system providing optimum scheduling and control of the vehicle as it hauls ore away from the continuous miner. In addition, the automatic guidance of the shuttle car does not require an on-board operator thus reducing personal injury and labor costs. In particular, greater efficiency in removing coal from a mine is anticipated by employing the subject invention, in that the periodic resecuring of a mine roof as the continuous miner advances into the coal face is no longer necessary in that an automated shuttle car may be employed to move into and from that area of the mine that does not have a secured roof without stopping at regular, short intervals to secure new roof plates to the mine roof; instead, the continuous miner may continue to dig for longer periods of time without the need of stopping the digging operation to secure the mine roof in that the automated shuttle car of this invention may move to and from the continuous miner without imposing a risk to a shuttle car operator.

In considering this invention, it should be remembered that the present disclosure is illustrative only and the scope of the invention should be determined by the appended claims. Though the present disclosure has been directed toward describing a shuttle car adapted to operate within a mining evironment, it is understood that the present invention could be employed, without departing from the scope of this invention, to control the movements of other vehicles such as agriculture vehicles, e.g. a tractor, or vehicles used in a warehouse to move articles or materials from one position to the next along a controlled path. It is further contemplated that the invention be employed to control the movement of the continuous miner described above.

I claim:

1. A vehicle guidance control system for controlling the movement of a vehicle along a selected path through an arrangement of corridors comprising a first corridor and a second corridor intersecting said first corridor, said second corridor extending on either side of said first corridor, the vehicle disposed within one of said first and second corridors, said vehicle guidance system comprising:
   (a) first and second sensors disposed respectively at a leading position and a trailing position with respect to the movement of the vehicle along said selected path and on a single side of the vehicle, said first and second sensors providing respectively first and second signals, each indicative of the distance from the said single side of the vehicle to a corridor surface disposed adjacent to said single side; and
   (b) comparison means for comparing said first and second signals and if said first signal is greater by a predetermined amount than said second signal, for providing a signal indicative of the presence of the other of said first and second corridors.

2. A vehicle guidance control system as claimed in claim 1, wherein there is a plurality of first corridors disposed substantially parallel to each other and a plurality of second corridors disposed substantially parallel with each other and to intersect said first corridors.

3. A vehicle guidance control system as claimed in claim 2, wherein said second corridors intersect said first corridors to define a potential control point at each point of such intersection, and said vehicle guidance control system further comprising memory means having a plurality of storage locations corresponding to said plurality of potential control points, each of said storage locations storing a command for directing vehicle operation.

4. A vehicle guidance control system as claimed in claim 3 wherein said potential control points are arrayed in a grid of X,Y coordinate points, and there is further included means for storing a manifestation of the current vehicle position in terms of its current X,Y coordinate position and responsive to the occurrence of said other corridor presence signal for updating the stored current vehicle manifestation within said storing means, and addressing means responsive to the updated, current vehicle position for addressing one of said plurality of storage locations, whereby the vehicle directing command stored in said addressed storage location is utilized to effect vehicle guidance.

5. A vehicle guidance control system as claimed in claim 1, wherein a third corridor intersects said one corridor to form a T-shaped intersection, and there is further included a third sensor disposed at a leading position on a second side of the vehicle opposite to said single side for providing a third signal indicative of the distance from the vehicle to a corridor surface disposed adjacent to said other side of the vehicle, said comparison means further responsive to said third signal and, if the difference between said first and third signals is greater than a predetermined amount, for providing a signal indicative of the presence of said T-shaped intersection.

6. A vehicle guidance control system as claimed in claim 5, wherein there is included a fourth sensor disposed at a trailing position on said second side of the vehicle for providing a fourth signal indicative of the distance from the vehicle to the corridor surface disposed adjacent said second side of the vehicle, and said comparison means responsive to said fourth signal for providing the signal indicative of the presence of said other corridor if said third signal is greater by a predetermined amount than said fourth signal.

7. A vehicle guidance control system for controlling the movement of a vehicle along a path having potentially therein obstacles of a first type requiring vehicle avoidance and obstacles of a second type not requiring vehicle avoidance, said vehicle guidance system comprising:
   (a) first and second sensors disposed on a leading end of the vehicle for transmitting energy signals and for receiving reflected energy signals from the obstacles to provided corresponding first and second output signals indicative of the reflected energy signals, the obstacles of said second type presenting similar reflective surface to said energy signals as transmitted from each of said first and second sensors;
   (b) means for comparing said first and second output signals to determine whether the wave forms of said first and second output signals are symmetric with respect to each other indicating a like scattering of the reflected energy signals as sensed by said first and second sensors, to provide a first vehicle avoidance signal indicating the presence of the obstacle of said first type; and
   (c) control means responsive to said first vehicle avoidance control signal for controlling the movement of the vehicle to avoid contact with the obstacle of the first type.

8. A vehicle guidance control system as claimed in claim 7, wherein the obstacles of said second type comprise a curtain disposed substantially perpendicular to said path and presenting a substantially flat surface to each of the transmitted energy signals from said first and second sensors.

9. A vehicle guidance control system as claimed in claim 8, wherein there is included memory means comprising a plurality of first locations for storing manifestations of the positions of obstacles of said second type along the path, and a second updateable location for storing a signal indicative of the current position of the vehicle along the path, and means for comparing said current position signal with said obstacle location manifestations and, if there is a match therebetween, for providing a second vehicle avoidance signal.

10. A vehicle guidance control system as claimed in claim 9, wherein there is further included means responsive only to both of said first and second vehicle avoidance signals for controlling the movement of the vehicle to avoid contact with the obstacle of said first type.

11. A vehicle guidance control system as claimed in claim 10, wherein said control means is responsive to said first vehicle avoidance signal for bringing the vehicle to a stop.

12. A vehicle guidance control system for controlling the movement of a vehicle along a selected path to a variable destination point, said vehicle guidance control system comprising:
 (a) vehicle steering means responsive to control signals for effecting vehicle guidance along said path;
 (b) updateable memory means for storing in an addressable area a manifestation indicative of the location of said variable destination point;
 (c) first communication means associated with said variable destination point for transmitting a signal indicative of a current position of the destination point;
 (d) second communication means associated with the vehicle for receiving the transmitted destination point signal;
 (e) said first communication means transmits repetitively a data ready signal, said second communication means for receiving said data ready signal and, upon reception, for transmitting in response thereto an initiate data transmission signal, said first communication means responsive to the receipt of said initiate data transmission signal for terminating the transmission of its data ready signal and for transmitting its signal indicative of the current position of said variable destination point; and
 (f) control means for updating said addressable area with said received destination point signal and for providing said control signals in accordance with said received and stored destination point signal, whereby the vehicle is guided to said variable destination point.

13. A vehicle guidance control system as claimed in claim 12, wherein there is further included a second vehicle having a second vehicle guidance control system for controlling the movement of said second vehicle to and from said variable destination point, the second vehicle proceeding toward said variable destination point and the first-mentioned vehicle is moving along its path from said variable destination point, said second vehicle guidance control system comprising:
 (a) second vehicle steering means responsive to control signals for effecting guidance of the second vehicle;
 (b) second updateable memory means for storing in an addressable area a manifestation indicative of the location of said variable destination point;
 (c) third communication means associated with the second vehicle;
 (d) said second communication means for transmitting said previously received and stored destination point signal, and said third communication means for receiving said destination point signal transmitted from said second communication means and for disposing it in said addressable area of its second updateable memory means; and
 (e) second control means for updating for providing control signals in accordance with said received and stored destination point signal, whereby the second vehicle is guided to said new variable destination.

14. A vehicle guidance control system as claimed in claim 13, wherein each of said first-mentioned and said second updateable memory means comprises a second area for respectively storing first and second manifestations of first and second "wait and see" points respectively; said first-mentioned and said second control means responsive to its "wait and see" point manifestations for providing control signals whereby its vehicle is guided to its "wait and see" point and brought to a stop thereat; said second communication means upon stopping of the first vehicle at its first "wait and see" point, operable to periodically transmit a first data ready signal; said third communication means upon stopping of the second vehicle at its second "wait and see" point, operable to receive said first data ready signal and upon reception of said first data ready signal, for transmitting a first initiate data transmission signal; said second communication means responsive to the receipt of said first initiate transmission signal for terminating the transmission of said first data ready signal and for transmitting its destination point signal; said third communication means for receiving said first-mentioned transmitted destination point signal and for updating said first-mentioned addressable area of said second updateable means with said received destination point signal and for providing control signals in accordance with said received and stored destination point signal, whereby the second vehicle is guided to said new variable destination point.

15. A vehicle guidance control system for controlling the movement of a vehicle along a variable, selected path defined by a sequence of points selected from an array of points, each point of said array being defined by first and second coordinates, said vehicle guidance system comprising:
 (a) sensing means for determining the presence of one of said points as the vehicle passes thereby and for providing a point manifestation indicative thereof;
 (b) vehicle steering means responsive to control signals for effecting vehicle guidance; and
 (c) control means for generating and applying said control signals to said vehicle steering means, said control means comprising:
  (1) means for storing a manifestation of the current vehicle position in terms of said first and second coordinates as it moves along and responsive to the occurrence of a point manifestation for updating said first and second coordinates of said current vehicle manifestation;
  (2) memory means having a plurality of storage locations corresponding to said array of points, selected of said storage locations storing a command for directing vehicle operation, each storage location of said memory means being addressable in terms of its first and second coordinates; and
  (3) addressing means responsive to said first and second coordinates of said current vehicle position for addressing one of said plurality of storage locations, whereby the vehicle directing command stored in said addressed storage location is applied to said vehicle steering means to effect vehicle guidance.

16. The vehicle guidance control system as claimed in claim 15, wherein said array of points is laid out as a grid of X, Y coordinate points and said memory means is configured as a matrix of storage locations in accordance with said grid of X, Y coordinate points, each storage location of said memory means being addressable in terms of its X and Y coordinates.

17. The vehicle guidance control system as claimed in claim 6, wherein said control means comprises means for storing a manifestation indicative of the current vehicle direction within said X, Y grid of coordinate points.

18. The vehicle guidance control system as claimed in claim 16, wherein said current vehicle position storing means stores the current vehicle position in terms of its X coordinate and its Y coordinate in corresponding X,Y storage locations.

19. The vehicle guidance system as claimed in claim 18, wherein the vehicle is adapted for movement through corridors aligned in accordance with said grid of X,Y coordinate points, and comprising a plurality of X corridors and a plurality of Y corridors disposed to intersect with said X corridors, said sensing means comprising first and second sensors disposed respectively at a leading position and a trailing position with respect to the movement of the vehicle along said path and on a single side of the vehicle, said first and second sensors providing, respectively, first and second signals, each indicative of the distance from the vehicle to a surface of the corridor disposed adjacent to said single side, and comparison means for comparing said first and second signals and if said first signal is greater by a predetermined amount than said second signal, for providing the point manifestation.

20. The vehicle guidance control system as claimed in claim 15, wherein a command to be stored within a selected storage location of said memory means comprises a turn command, whereby said control means applies control signals to said vehicle steering means to effect a turn of the vehicle.

21. The vehicle guidance control system as claimed in claim 20, wherein a command to be stored within a selected storage location of said memory means is a stop command, whereby said control means applies a control signal to bring the vehicle to a halt.

22. The vehicle guidance control system as claimed in claim 20, wherein a command stored within a selected storage location of said memory means comprises a proceed command, whereby said control means continues to direct the movement of the vehicle along a selected path without change.

23. The vehicle guidance control system as claimed in claim 15, wherein a command to be stored within a selected storage location of said memory means comprises a turn command including a new vehicle direction to be assumed by the vehicle after said turn command has been executed.

24. The vehicle guidance control system as claimed in claim 23, wherein said control means updates said vehicle direction manifestation storing means with a new vehicle direction after said turn command has been executed.

25. The vehicle guidance control system as claimed in claim 24, wherein said vehicle direction manifestation may be positive or negative within the context of said grid of X,Y coordinate points, said control means responsive to a positive vector direction manifestation to increment said current vehicle position manifestation as stored in said current vehicle position storing means and responsive to a negative vector to decrement said current vehicle position manifestation.

26. The vehicle guidance control system as claimed in claim 23, wherein said storing means comprises first means for storing the X coordinate of the current vehicle position and second means for storing the Y coordinate of the current vehicle position, and means responsive to the occurrence of a point manifestation and its present vehicle direction to update one of said X and Y coordinates dependent upon said present vehicle direction.

27. The vehicle guidance control system as claimed in claim 15, wherein said control means comprises means for storing a first X,Y coordinate position indicative of the starting point of said selected path and a second X,Y coordinate position indicative of the terminating point of said selected path.

28. A vehicle guidance control system for controlling the movement of a vehicle along a selected path defined by a vehicle direction and a sequence of points selected from an array of points, each point being defined by first and second coordinates, said vehicle guidance control system comprising:
  (a) sensing means for determining the presence of a point as the vehicle passes thereby and for providing a point manifestation indicative thereof;
  (b) vehicle steering means responsive to control signals for effecting vehicle guidance; and
  (c) control means for generating and applying said control signals to said vehicle steering means, said control means comprising:
    (1) first and second means for storing respectively the first and second coordinates defining the current vehicle position;
    (2) means responsive to the occurrence of a point manifestation and to the current vehicle direction for updating one of said first and second coordinates dependent upon the current vehicle direction;
    (3) memory means having a plurality of storage locations corresponding to said array of points, each of said storage locations storing selected ones of a plurality of commands for directing vehicle operation, each storage location of said memory means being addressable in terms of its first and second coordinates, said commands comprising a turn command and a new vehicle direction to be assumed by the vehicle after said turn command has been executed; and
    (4) addressing means responsive to said first and second coordinates of said current vehicle position for addressing one of said plurality of storage locations, whereby the vehicle directing commands stored in said one addressed storage location is applied to said vehicle steering means to effect vehicle guidance.

29. The vehicle guidance control system as claimed in claim 28, wherein there is included a third means for storing the current vehicle direction and responsive to the completion of said turn command for storing the new vehicle direction.

30. The vehicle guidance control system as claimed in claim 29, wherein said vehicle direction may be positive or negative, said updating means responsive to a positive vehicle direction for incrementing one of said first and second coordinates corresponding to its current vehicle direction and responsive to a negative vehicle direction for decrementing one of said first and second coordinatess corresponding to its current vehicle direction.

31. The vehicle guidance control system as claimed in claim 28, wherein each of said plurality of storage locations is capable of storing a plurality of commands for directing distinct vehicle operations.

32. The vehicle guidance control system as claimed in claiim 31, wherein there is further included detection means responsive to an input signal transmitted from a remote location for providing a vehicle control manifestation, and said addressing means is responsive to the current vehicle position for addressing one of said plurality of storage locations and to said vehicle control manifestation for selecting one of said addressed plurality of vehicle directing commands dependent thereon.

33. The vehicle guidance control system as claimed in claim 32, wherein said detection means comprises radio receiver means for receiving the transmitted input signal.

34. The vehicle guidance control system as claimed in claim 32, wherein said plurality of vehicle directing commands includes a "wait and see" command, said control means comprises means responsive to said "wait and see" command for accessing said detection means to initiate receipt of the transmitted input signal and responsive thereto for selection of which of said plurality of commands stored at said addressed storage location to be executed for control of said vehicle guidance.

35. A vehicle guidance control system for controlling the movement of a vehicle along a path having potentially therein obstacles of a first type requiring vehicle avoidance and obstacles of a second type not requiring vehicle avoidance, said vehicle guidance system comprising:
 (a) first and second sensors disposed on a leading end of the vehicle for transmitting first and second energy signals and for receiving reflected energy signals from the obstacles to provide corresponding first and second output signals indicative of the reflected energy signals, each of said first and second energy signals having substantially similar phase components, the first type of obstacle reflecting said first and second energy signals with substantially similar phase transformations, the second type of obstacle reflecting said first and second energy signals with substantially different phase transformations;
 (b) means for comparing the phase components of said first and second output signals to determine whether the phase components of said first and second signals are substantially different, and if so, indicating the detection of an obstacle of the first type for providing a vehicle avoidance signal; and
 (c) control means responsive to said vehicle avoidance control signal for controlling the movement of the vehicle to avoid contact with the obstacle of the first type.

36. A vehicle guidance control system for controlling the movement of a vehicle along a selected path to a variable destination point, said vehicle guidance control system comprising:
 (a) vehicle steering means responsive to control signals for effecting vehicle guidance along said path;
 (b) memory means for storing in an addressable area a manifestation indicative of the current location of the current destination point;
 (c) first communication means associated with said variable destination point for transmitting a signal indicative of a new position of the destination point;
 (d) second communication means associated with the vehicle for receiving the transmitted destination point signal; and
 (e) control means comprising means for updating said addressable area with said received new destination point signal and means for determining a new path to said new destination point in accordance with the received and stored new destination point signal.

37. A vehicle guidance control system for controlling the movement of a vehicle along a selected path, said path directed in part through a first corridor and in part through an intersection of said first corridor with a second corridor, said first corridor haing first and second side surfaces disposed substantially parallel to and spaced relatively close to the respective lateral sides of the vehicle, said second corridor extending on either side of said corridor, said vehicle guidance control system comprising:
 (a) vehicle steering means responsive to control signals for guiding the vehicle along said selected path;
 (b) first and second sensors disposed respectively at a leading position and a trailing position with respect to the movement of the vehicle along said path and on a single side of the vehicle, said first and second sensors providing respectively first and second signals, each indicative of the distance from said single side of the vehicle to a corridor surface disposed adjacent to its sensor;
 (c) gyro means disposed on the vehicle for providing a vector manifestation indicative of the direction in which the vehicle is moving; and
 (d) control means responsive to said first and second signals and operative in a first mode when said first and second signals are substantially equal for providing control signals to said vehicle steering means to maintain the vehicle moving along a median of said first corridor, and in a second mode when one of said first and second signals exceeds the other by a predetermined amount, for utilizing said vector manifestation of said gyro means to provide control signals to said vehicle steering means whereby the vehicle is guided through said intersection.

38. A vehicle guidance control system as claimed in claim 37, wherein a third sensor is disposed at a leading position with respect to the movement of the vehicle along said path on a second side of the vehicle opposite said first mentioned side, said third sensor providing a third signal indicative of the distance of said second side of the vehicle to a corridor surface disposed adjacent thereto.

39. A vehicle guidance control system as claimed in claim 38, wherein said control means operates in its first mode to provide control signals whereby the difference between said first and third signals is directed toward a minimum.

40. A vehicle guidance control system as claimed in claim 38, wherein a fourth sensor is disposed at a trailing portion with respect to the movement of the vehicle along said path on said second side of the vehicle, said fourth sensor providing a fourth signal indicative of the distance from said second side of the vehicle to a corridor surface disposed ajdacent thereto.

41. A vehicle guidance control system as claimed in claim 40, wherein said control means operates in its first mode to provide control signals tending to reduce the difference between said second and fourth signals towards a minimum, whereby the vehicle is guided along a median of said first corridor.

42. A vehicle guidance control system as claimed in claim 41, wherein a third corridor intersects said first corridor in a T-shaped intersection, said control means examines said first, second, third and fourth signals and upon occurrence of one of the following: said first signal exceeds by a predetermined amount said third signal, said third signal exceeds by a predetermined amount said first signal, said second signal exceeds by a predetermined amount said fourth signal, and said fourth signal exceeds by a predetermined amount said second signal, said control means indicates the presence of said third corridor and is operative in said second mode.

43. A vehicle guidance control system for controlling the movement of a vehicle along a selected path through an arrangement of corridors comprising a first corridor and a second corridor intersecting said first corridor, said second corridor intersects said first corridor to form a T-shaped intersection therewith, the vehicle initially disposed within said first corridor, said vehicle guidance control system comprising:
  (a) first and second sensors disposed respectively on first and second sides of the vehicle, said first and second sensors providing respectively first and second signals, each indicative of the distance from its side of the vehicle to a corridor surface disposed adjacent to the vehicle; and
  (b) comparison means for comparing said first and second signals and, if said first signal is greater by a predetermined amount than said second signal; for providing a signal indicative of the vehicle's entering said second corridor.

44. A vehicle guidance system as claimed in claim 43, where said arrangement of corridors includes a third corridor intersecting said first corridor and extending on either side of said first corridor, and there is further included a third sensor disposed at trailing position with respect to and on said same side of the vehicle as said first sensor, said third sensor providing a third signal indicative of the distance to the corridor surface adjacent to said first side of the vehicle, said comparison means comparing said first and third signals and if said first signal is greater by a predetermined amount than said third signal, for providing a signal indicative of the vehicle entering said third corridor.

45. A vehicle guidance control system for controlling the movement of a vehicle along a variable selected path defined by a sequence of points selected from an array of points, each point of said array being defined by first and second coordinates, said sequence of points defining said path including at least one destination point, a first flag indicating that said vehicle is approaching said destination point and a second flag indicating that said vehicle is going away from said destination point, said vehicle guidance system comprising:
  (a) sensing means for determining the presence of one of said points as the vehicle passes thereby and for providing a point manifestation indicative thereof;
  (b) vehicle steering means responsive to control signals for effecting vehicle guidance; and
  (c) control means for generating and applying said control signals to said vehicle steering means, said control means comprising:
    (1) means for storing a manifestation of the current vehicle position in terms of said first and second coordinates as it moves along said path and responsive to the occurrence of a point manifestation for updating said first and second coordinates of said current vehicle manifestation;
    (2) means for storing one of said first and second flags;
    (3) means responsive to the vehicle's passage of said destination point for setting and storing said second flag in said storing means;
    (4) memory means having a plurality of storage locations corresponding to said array of points, selected of said storage locations storing a plurality of commands for directing vehicle operation, each storage location of said memory being addressable in terms of said first and second coordinates; and
    (5) addressing means responsive to said first and second coordinates of said current vehicle position for addressing one of said plurality of storage locations, and responsive to one of said first and second flags as stored in said flag storing means for selecting which of said addressed plurality of commands to be applied to said vehicle steering means to effect vehicle guidance.

46. The vehicle guidance control system as claimed in claim 45, wherein there is included a second vehicle having a second vehicle guidance control system for controlling the movement of said second vehicle to and from said destination point, said second vehicle guidance control system comprising:
  (a) second sensing means for determining the presence of one of said points as the second vehicle passes thereby and providing a second point manifestation indicative thereof;
  (b) second vehicle steering means responsive to second control signals for effecting the guidance of the second vehicle;
  (c) second control means for generating and applying said second control signals to said second vehicle steering means, said second control means comprising:
    (1) second means for storing a second manifestation of the current vehicle position of the second vehicle in terms of said first and second coordinates as it moves along said path and responsive to the occurrence of a second point manifestation for updating said first and second coordinates of said second current vehicle manifestation;
    (2) second means for storing one of said first and second flags;
    (3) second means responsive to the passage of said destination point by the second vehicle for setting and storing said second flag in said second flag storing means;
    (4) second memory means having a plurality of storage locations corresponding to said array of points, selected of said storage locations storing a plurality of commands for directing vehicle operation, each storage location of said second memory means being addressable in terms of said first and second coordinates; and (5) second addressing means responsive to said first and second coordinates of the current vehicle position of the second vehicle for addressing one of said plurality of storage locations of said second memory means, and responsive to one of said first and second flags as stored in said second flag storing means for selecting which of said addressed plurality of commands to be applied to said second vehicle steering means to effect vehicle guidance of the second vehicle; and (d) each of said first mentioned and said second control means comprising respectively first and second communication means for transmitting and receiving data indicative of said first and second coordinates of said destination point, and transmission initiation means responsive to the presence of said second flag for initiating the corresponding of said first and second communication means to transmit a signal indicative of said first and second coordinates of said destination point to said communication means of the other of the first and second vehicles.

47. A guidance control system for controlling the movements of first and second vehicles along selected first and second paths respectively, each of said first and second vehicles having a vehicle guidance control system comprising:

(a) vehicle steering means responsive to control signals for effecting vehicle guidance along its path;

(b) updateable memory means for storing in an addressable area a manifestation indicative of whether said vehicle is a slave vehicle or a master vehicle;

(c) communication means operative in a transmitting mode for transmitting vehicle guidance signals and in a reception mode for receiving vehicle guidance signals; and (d) control means responsive to said master car manifestation for directing the master vehicle to a first point along its selected path and, after the master vehicle has reached said point, for disposing its communication means in its transmitting mode to transmit vehicle control signals to the slave vehicle, and responsive to said slave car manifestation for directing the slave car vehicle to a second location along its selected path distinct from said first location and for disposing its communication means to a reception mode to receive the vehicle guidance signals transmitted by said communication means of the master vehicle.

48. A vehicle guidance control system for controlling the movement of the vehicle along a variable selected path defined by a sequence of points selected from an array of points, said vehicle guidance system comprising:

(a) sensing means for determining the presence of one of said points as the vehicle passes thereby and providing a point manifestation indicative thereof;

(b) vehicle steering means responsive to control signals for effecting vehicle guidance; and (c) control means for generating and applying said control signals to said vehicle steering means, said control means comprising:

(1) means for storing a manifestation indicative of the current vehicle position and responsive to the occurrence of a point manifestation for updating the current vehicle manifestation;

(2) memory means having a plurality of storage locations corresponding to said array of points, selected of said storage locations storing a turn command for effecting a vehicle turn so that the vehicle proceeds along a completed turn vector indicative of the direction in which the vehicle is heading after the turn has been completed;

(3) gyro means disposed on the vehicle for providing a current vector indicative of the direction in which the vehicle is presently moving;

(4) addressing means responsive to the current vehicle position for addressing one of said plurality of storage locations to read out and execute a turn command; and (5) comparing means responsive to said turn command for accessing said gyro means to obtain and compare said current vector with said completed turn vector to determine whether said turn is complete.

49. The vehicle guidance control system as claimed in claim 48, wherein said comparing means supplies control signals to said vehicle steering means to effect vehicle turning if the turn is not complete.

50. The vehicle guidance control system as claimed in claim 49, wherein said control means comprises means for determining whether said vehicle steering means is effecting a maximum turn and, if not, for supplying control signals to said vehicle steering means to effect an increase of turning.

51. A vehicle guidance control system as claimed in claim 50, wherein there is included a first plurality of said first corridors, each first corridor disposed substantially parallel with each other and a second plurality of said second corridors, each second corridor disposed to intersect said first corridor to define a plurality of intersection points, and said control means comprising means for storing a manifestation of the current vehicle position as it moves along said median path, memory means having a plurality of storage locations corresponding to said intersection points, each of said storage locations storing a command for directing vehicle operation, and addressing means responsive to the occurrence of said corridor entrance signal for addressing one of said plurality of storage locations, in accordance with said current vehicle position manifestation, whereby said vehicle directing command stored in said addressed storage location is applied to said vehicle steering means to effect vehicle guidance.

52. A vehicle guidance control system as claimed in claim 50, wherein there is included gyro control means responsive to said corridor entrance signal for providing a vector direction signal to said vehicle steering means to maintain the movement of the vehicle along a direction as previously determined by said gyro control means.

53. A vehicle guidance control system as claimed in claim 52, wherein said control means is operative in a first mode to provide said control signals in accordance with said difference between said first and second signals and upon the occurrence of said corridor entrance signal, to operate in a second mode to generate control signals in response to said vector direction signal provided by said gyro means when last operative in said first mode.

54. A vehicle guidance control system as claimed in claim 53, wherein said control means comprises means associated with said gyro control means for storing the current vector direction signal, and upon operating in said second mode, for utilizing the stored vector direction signal to generate and apply said control signals to said steering means to control the movement of the vehicle through said other intersecting corridor.

55. A vehicle guidance control system for controlling the movement of a vehicle along a median path through a corridor, said corridor having first and second side surfaces disposed substantially parallel respectively to opposing first and second lateral sides of the vehicle, said vehicle guidance control system comprising:

(a) vehicle steering means responsive to control signals for effecting vehicle guidance along said median path;

(b) first and second sensors disposed respectively on said first and second lateral sides of the vehicle, said first and second sensors providing respectively first and second signals, each of said first and second signals being indicative of the respective distance from its lateral side to its corridor side surface;

(c) third and fourth sensors disposed at a trailing position from said first and second sensors with respect to the movement of the vehicle along said median path and on said first and second lateral sides of the vehicle respectively, said third and fourth sensors providing respectively third and fourth signals, each of said third and fourth signals being indicative of the respective distance from its lateral side to its corridor side surface;

(d) control means for providing said control signals in accordance with the differences respectively between said first and second signals and said third and fourth signals and for applying said control signals to said vehicle steering means to maintain the vehicle disposed on the median path, said control means provides said control signals to direct said vehicle steering means such that the differences respectively between said first and second signals, and third and fourth signals is minimized, said control means being responsive to said first, second, third and fourth signal for periodically providing said control signals calculated in a least-squares nature to maintain the vehicle disposed on said median path, said control means comprises means for determining any one of the following conditions: said first signal is in excess of said second signal by a predetermined amount, said second signal is in excess of said first signal by a predetermined amount, said third signal is in excess of said fourth signal by a predetermined amount, and said fourth signal is in excess of said third signal by a predetermined amount, to provide a corridor entrance signal indicating that the vehicle is proceeding along one of first and second corridors and has entered an intersection with the other of said first and second corridors.

* * * * *